United States Patent
Aoyama et al.

(10) Patent No.: US 9,967,536 B2
(45) Date of Patent: May 8, 2018

(54) VIDEO FORMAT DETERMINATION DEVICE, VIDEO FORMAT DETERMINATION METHOD, AND VIDEO DISPLAY DEVICE

(71) Applicant: SATURN LICENSING LLC, New York, NY (US)

(72) Inventors: Koji Aoyama, Saitama (JP); Mitsuo Sato, Kanagawa (JP); Tomoichi Fujisawa, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days. days.

(21) Appl. No.: 15/002,245

(22) Filed: Jan. 20, 2016

(65) Prior Publication Data

US 2016/0142696 A1    May 19, 2016

Related U.S. Application Data

(62) Division of application No. 13/875,817, filed on May 2, 2013, now Pat. No. 9,571,808.

(30) Foreign Application Priority Data

May 15, 2012  (JP) ................................. 2012-111815

(51) Int. Cl.
    *H04N 13/00*    (2006.01)
(52) U.S. Cl.
    CPC ... *H04N 13/0007* (2013.01); *H04N 2213/007* (2013.01)
(58) Field of Classification Search
    CPC ......... H04N 13/0007; H04N 2213/007; H04N 2013/0074; H04N 2013/0092
    See application file for complete search history.

(56) References Cited

U.S. PATENT DOCUMENTS 7,839,378 B2 *  11/2010  Krijn ................... H04N 13/0413
                                                            345/102
8,587,518 B2 *  11/2013  Davies ................... H04N 17/00
                                                            345/157
(Continued)

FOREIGN PATENT DOCUMENTS

CN        101196994 A     6/2008
CN        101980545 A     2/2011
(Continued)

OTHER PUBLICATIONS

Office Action dated Jan. 6, 2015 in Chinese Application No. 201310167968.9 (w/English translation).
(Continued)

*Primary Examiner* — Brian Yenke
(74) *Attorney, Agent, or Firm* — Oblon, McClelland, Maier & Neustadt, L.L.P.

(57) ABSTRACT

There is provided a video format determination device including a video input unit that receives video having a feature amount for each pixel, a region representative value calculation unit that divides a left-eye video region and a right-eye video region in a three-dimensional video format to be determined in input video into small regions, and then computes representative values of feature amounts of the respective small regions for each of the left-eye video region and the right-eye video region, a correction value calculation unit that calculates a correction value to correct the representative values, a data correction unit that corrects the representative values, an inter-region correlation calculation unit that calculates the correlation between the left- and right-eye video regions, and an evaluation determination unit that evaluates the correlation to determine whether input video is in the three-dimensional video format.

14 Claims, 28 Drawing Sheets

(56) References Cited

U.S. PATENT DOCUMENTS

| | | | | |
|---|---|---|---|---|
| 8,861,837 B2* | 10/2014 | Diggins | H04N 13/0048 | 382/154 |
| 8,891,856 B2* | 11/2014 | Zhou | H04N 13/00 | 345/419 |
| 8,941,717 B2* | 1/2015 | Baker | H04N 13/0022 | 345/157 |
| 9,571,808 B2* | 2/2017 | Aoyama | H04N 13/0007 | |
| 2003/0128273 A1* | 7/2003 | Matsui | H04N 13/0003 | 348/51 |
| 2007/0217509 A1* | 9/2007 | Chan | H04N 9/78 | 375/240.12 |
| 2009/0041336 A1* | 2/2009 | Ku | G06T 7/0075 | 382/154 |
| 2009/0154368 A1* | 6/2009 | Kim | H04L 41/509 | 370/252 |
| 2009/0284584 A1* | 11/2009 | Wakabayashi | H04N 13/007 | 348/44 |
| 2010/0039428 A1* | 2/2010 | Kim | H04N 13/0454 | 345/419 |
| 2010/0053306 A1* | 3/2010 | Hirasawa | H04N 13/0048 | 348/43 |
| 2010/0321390 A1* | 12/2010 | Kim | H04N 13/0029 | 345/427 |
| 2011/0164110 A1* | 7/2011 | Fortin | H04N 13/0048 | 348/43 |
| 2011/0249889 A1* | 10/2011 | Kothandaraman | G06T 7/0026 | 382/154 |
| 2011/0293170 A1* | 12/2011 | Hatasawa | G02B 27/22 | 382/154 |
| 2012/0044246 A1* | 2/2012 | Morifuji | G06T 7/0022 | 345/419 |
| 2012/0062699 A1* | 3/2012 | Diggins | H04N 13/0048 | 348/43 |
| 2012/0105607 A1* | 5/2012 | Wang | H04N 13/0029 | 348/53 |
| 2012/0133733 A1* | 5/2012 | Sakaniwa | H04N 13/0025 | 348/43 |
| 2012/0162365 A1* | 6/2012 | Miura | H04N 5/782 | 348/43 |
| 2012/0235996 A1* | 9/2012 | Zhang | G06T 7/593 | 345/419 |
| 2012/0242792 A1* | 9/2012 | Zhang | H04N 13/0003 | 348/43 |
| 2012/0256912 A1* | 10/2012 | Yamaguchi | H04N 13/0022 | 345/419 |
| 2012/0268560 A1* | 10/2012 | Kobayashi | H04N 13/0007 | 348/43 |
| 2012/0300027 A1* | 11/2012 | Urisu | H04N 13/007 | 348/43 |
| 2012/0314028 A1* | 12/2012 | Bruls | H04N 13/0003 | 348/43 |
| 2012/0327189 A1* | 12/2012 | Muramatsu | G01C 3/06 | 348/46 |
| 2013/0044192 A1* | 2/2013 | Mukherjee | H04N 13/0029 | 348/51 |
| 2013/0162769 A1* | 6/2013 | Zhou | H04N 5/14 | 348/43 |
| 2013/0265389 A1* | 10/2013 | Hrebien | H04N 13/0048 | 348/43 |
| 2013/0293673 A1* | 11/2013 | Hrebien | H04N 5/46 | 348/43 |
| 2015/0264342 A1* | 9/2015 | Chen | G09G 3/3611 | 348/51 |

FOREIGN PATENT DOCUMENTS

| | | |
|---|---|---|
| CN | 102340676 A | 2/2012 |
| CN | 102395037 A | 3/2012 |
| JP | 2006-332985 | 12/2006 |
| JP | 2009-217606 | 9/2009 |
| JP | 2010-68309 | 3/2010 |
| JP | 2010-169777 | 8/2010 |
| JP | 2011-146831 | 7/2011 |
| JP | 2011-239172 | 11/2011 |
| JP | 2012-19308 | 1/2012 |

OTHER PUBLICATIONS

Office Action dated Sep. 1, 2015 in Chinese Application No. 201310167968.9.

* cited by examiner

FIG. 14

| LEFT-EYE VIDEO REGION | | | | RIGHT-EYE VIDEO REGION | | | |
|---|---|---|---|---|---|---|---|
| 148 | 138 | 118 | 112 | 162 | 154 | 133 | 127 |
| 153 | 121 | 130 | 118 | 169 | 136 | 146 | 143 |
| 149 | 131 | 139 | 124 | 165 | 146 | 155 | 138 |
| 149 | 161 | 162 | 150 | 164 | 178 | 179 | 167 |
| 136 | 139 | 147 | 133 | 153 | 155 | 164 | 149 |
| 131 | 130 | 114 | 108 | 148 | 147 | 130 | 121 |

FIG. 15

| | LEFT-EYE VIDEO REGION | | | | RIGHT-EYE VIDEO REGION | | |
|---|---|---|---|---|---|---|---|
| 1 | 2 | 3 | 4 | 1 | 2 | 3 | 4 |
| 1 | 4 | 2 | 3 | 1 | 4 | 2 | 3 |
| 1 | 3 | 2 | 4 | 1 | 3 | 2 | 4 |
| 4 | 2 | 1 | 3 | 4 | 2 | 1 | 3 |
| 3 | 2 | 1 | 4 | 3 | 2 | 1 | 4 |
| 1 | 2 | 3 | 4 | 1 | 2 | 3 | 4 |

FIG. 16
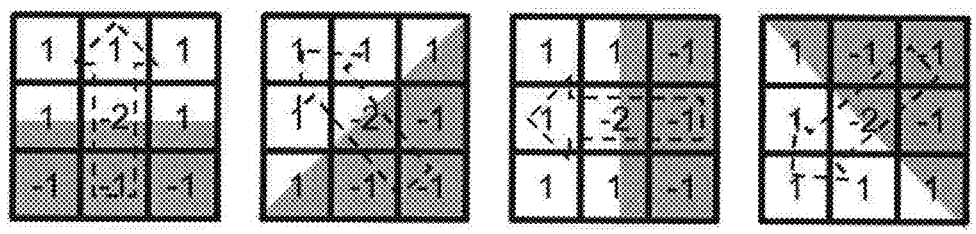
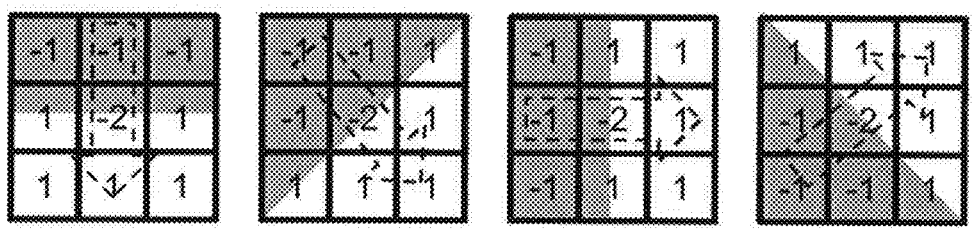

Related Art

Related Art

Related Art

VIDEO FORMAT DETERMINATION DEVICE, VIDEO FORMAT DETERMINATION METHOD, AND VIDEO DISPLAY DEVICE

CROSS REFERENCES TO RELATED APPLICATIONS

The present application is a divisional application of U.S. patent application Ser. No. 13/875,817, filed May 2, 2013, which claims the benefit of priority from prior Japanese Application No. 2012-111815, filed May 15, 2012, the entire content of which is hereby incorporated by reference

BACKGROUND

The technology disclosed in the present specification relates to a video format determination device and a video format determination method that are used to determine the format of a video signal, and a video display device that switches display modes of a video signal based on a format determination result, and more particularly, to a video format determination device, a video format determination method, and a video display device that realize reliable determination of a three-dimensional video format or two-dimensional video format with a small calculation amount.

A viewer can be presented with a stereoscopic video that can be three-dimensionally seen by displaying a video using parallax between right and left eyes. For example, a time-division stereoscopic video display system includes a combination of a display device that displays a plurality of different videos in a time-division manner and eyeglasses that video viewers wear. The display device alternately displays left-eye images and right-eye images having parallax at very short time intervals. In addition, while a left-eye video is displayed, the left eye part of the eyeglasses transmits light, and the right eye part thereof is shielded from light. On the other hand, while a right-eye video is displayed, the right eye part of the eyeglasses transmits light, and the left eye part is shielded from light. In addition, in a space-division stereoscopic video display system, a left-eye video and a right-eye video are multiplexed and displayed on one screen, and the left eye part of eyeglasses that a viewer wears only transmits light of the left-eye video, and the right eye part thereof only transmits light of the right-eye video. In both systems, the brain of a user who views the video fuses the left-eye video and the right-eye video so as to recognize the fusion as a stereoscopic video.

As transmission formats of three-dimensional video signals, for example, three types of a side-by-side format, a top-and-bottom format, and a frame sequential format can be exemplified. In the side-by-side format, active regions of two-dimensional video signals are divided into two halves in the horizontal direction as shown in FIG. 23, and a (concurrent) left-eye video L and a right-eye video R are multiplexed to the left and right sides, that is, in the horizontal direction. In addition, in the top-and-bottom format, active regions of two-dimensional video signals are divided into two halves in the vertical direction as shown in FIG. 24, and a (concurrent) left-eye video L and right-eye video R are multiplexed to the upper and lower sides, that is, in the vertical direction. In the frame sequential format, left-eye videos L and right-eye videos R are alternately inserted on a time axis as shown in FIG. 25.

Any of the transmission formats controls a display device that processes video signals such that left-eye videos and right-eye videos are separated from the signals, correctly arranged on the time axis, and thereby the left-eye videos are displayed for the left eye and the right-eye videos are displayed for the right eye. In this case, it is of course necessary to switch a display format by determining whether or not the video signal currently transmitted is for three-dimensional videos, and if the signal is for three-dimensional videos, determining in what transmission format shown in any of FIGS. 23 to 25 described above the signal is.

If a signal indicating a transmission format is added to transmitted video data, the determination can be accurately made. However, there are some broadcasting signals and DVDs (Digital Versatile Discs) to which such a signal is not added. In addition, there is content of which signals have different transmission formats, such as two-dimensional video content of a TV commercial, and three-dimensional video content of a TV program. Manually switching display modes every time signals are switched is very inconvenient for a viewer. If a display mode for which a video format is wrong is selected, an inconvenient incident in which two different types of images are displayed overlappingly occurs.

There are several proposals for devices that determine a video format from correlation of regions respectively corresponding to a left-eye video and a right-eye video in an image. For example, a proposal for a video display device that switches a display format by obtaining a position histogram from difference values in units of pixels to calculate correlation, and determining whether or not the result is for three-dimensional video has been made (for example, refer to Japanese Unexamined Patent Application Publication No. 2010-68309). In addition, another proposal for a stereoscopic image format determination device that automatically determines a format from the inner product of feature amounts of each region of a left-eye video and a right-eye video has been made (refer to Japanese Unexamined Patent Application Publication No. 2006-332985).

In the method for determining a format having the correlation between respective left- and right-eye video regions in a video signal as an index, determination of whether data is for three-dimensional video or two-dimensional video is made by obtaining predetermined feature amounts from the video regions and having a cumulative result of the absolute difference value between the feature amounts as estimation values. Herein, when an evaluation value is small, the correlation between the left- and right-eye video regions is high, and thus it can be determined that the respective regions are in the relationship of corresponding left and right videos, in other words, data is for three-dimensional video. Conversely, when an evaluation value is large, the correlation between the left- and right-eye video regions is low, and thus it can be determined that the respective regions are not in the relationship of corresponding left and right videos, and the data is for two-dimensional video.

However, if evaluation is performed merely based on the calculation of the correlation between left- and right-eye video regions, there are problems in terms of performance in that determination accuracy is low, and reliability is hard to guarantee.

For example, since there is parallax between a left video and a right video in a stereoscopic video, the correlation between the videos is low when the parallax is large, and thus there is a possibility of making erroneous determination that the video is not a three-dimensional video. FIG. 26 shows a result of an absolute difference value ABS (Lch-Rch) of feature amounts by simply matching the feature amounts of a left-eye video (Lch) and a right-eye video (Rch) having parallax. As shown in the drawing, when parallax is large, a difference is generated between videos, accordingly the correlation is low, and as a result, there is a possibility of making erroneous determination that the video is a two-dimensional video.

In addition, there is a possibility of making erroneous determination that a video is not a three-dimensional video due to a difference other than parallax between left and right videos. There is no problem in a CG (Computer Graphics) video, or the like, but particularly in the case of a three-dimensional video photographed using a twin lens camera, luminance, contrast, γ, color, bands of video signals, a noise amount, and the like may be significantly different between left and right videos due to differences in characteristics, differences in installation accuracy of lens systems, and the like. FIG. 27 shows a result of an absolute difference value ABS (Lch-Rch) of a feature amount by simply matching the feature amounts of a left-eye video (Lch) and a right-eye video (Rch) showing differences in luminance and contrast. As shown in the drawing, the difference is further made between videos when the differences in luminance and contrast are great, the correlation thereof becomes low, and thus a possibility of making erroneous determination that the videos are two-dimensional videos continuously increases.

Conversely, there are also cases in which a two-dimensional video is erroneously determined to be a three-dimensional video if videos having a high correlation between regions respectively corresponding to a left-eye video and a right-eye video are included therein. FIG. 28 shows an image of a seascape as an example of an image showing an insufficient change in luminance and contrast, and since the difference in the feature amounts on the left and right sides of the image is small and a high correlation is shown, there is a possibility of the image being erroneously determined as a three-dimensional video in the side-by-side format.

In addition, during determination of a video format, the evaluation method merely using calculation of the correlation between left- and right-eye video regions includes calculation in units of pixels and calculation of an inner product, which causes a large calculation amount, and therefore the amount adversely affects fast determination and costs.

SUMMARY

It is desirable for the technology disclosed in the present specification to provide excellent video format determination device, video format determination method, and video display device that can reliably realize determination of a three-dimensional video format or a two-dimensional video format with a small calculation amount.

According to an embodiment of the present disclosure, there is provided a video format determination device including a video input unit that receives video having a feature amount for each pixel, a region representative value calculation unit that divides a left-eye video region and a right-eye video region in a three-dimensional video format to be determined in input video into small regions having M rows and N columns, respectively, and then computes representative values of feature amounts of the respective small regions for each of the left-eye video region and the right-eye video region, a correction value calculation unit that calculates a correction value to correct the representative values based on an average value of feature amounts of the left-eye video region and an average value of feature amounts of the right-eye video region, a data correction unit that corrects the representative values of the respective small regions computed for one of the left-eye video region and the right-eye video regions using the correction value, an inter-region correlation calculation unit that calculates the correlation between the left- and right-eye video regions by cumulatively adding differences of the representative values of corresponding small regions in the left-eye video region and the right-eye video region, and an evaluation determination unit that evaluates the correlation between the left- and right-eye video regions to determine whether input video is in the three-dimensional video format.

Further, according to an embodiment of the present disclosure, there is provided a video format determination device including a video input unit that receives video having a feature amount for each pixel, a region representative value calculation unit that divides a left-eye video region and a right-eye video region in a three-dimensional video format to be determined in input video into small regions having M rows and N columns, respectively, and then computes representative values of feature amounts of the respective small regions for each of the left-eye video region and the right-eye video region, an inter-region correlation calculation unit that calculates the correlation between the left- and right-eye video regions by cumulatively adding differences of the representative values of corresponding small regions in the left-eye video region and the right-eye video region, an intra-region correlation calculation unit that calculates the correlation within at least one region of the left-eye video region and the right-eye video region, and an evaluation determination unit that calculates an evaluation value based on a ratio of the correlation between the left- and right-eye video regions to the correlation within the region to determine whether input video is in the three-dimensional video format based on the evaluation value.

The region representative value calculation unit may use a luminance signal of each pixel as a feature amount.

The inter-region correlation calculation unit may calculate the correlation between the left- and right-eye video regions based on the differences of the representative values of corresponding small regions in the left-eye video region and the right-eye video region.

The inter-region correlation calculation unit may calculate the correlation between the left- and right-eye video regions by performing cumulative weighted addition of the differences of the representative values of corresponding small regions between the left-eye video region and the right-eye video region.

The inter-region correlation calculation unit may perform the cumulative weighted addition using a weighting function that suppresses addition of a difference whose value is equal to or lower than a predetermined value.

The video format determination device may further include an intra-region correlation calculation unit that calculates the correlation within at least one region of the left-eye video region and the right-eye video region. The evaluation determination unit may calculate an evaluation value based on a ratio of the correlation between the left- and right-eye video regions to the correlation within the region to determine whether input video is in the three-dimensional video format based on the evaluation value.

The evaluation determination unit may defer determination of a video format of input video when the correlation within the region has a value equal to or lower than a predetermined threshold value.

The region representative value calculation unit may dispose the left-eye video region and the right-eye video region on left and right of the input video, respectively, and computes representative values of the respective small regions in a determination mode to determine whether or not the input video is three-dimensional video in a side-by-side format.

The region representative value calculation unit may dispose the left-eye video region and the right-eye video region on top and bottom of the input video, respectively, and computes representative values of the respective small regions in a determination mode to determine whether or not the input video is three-dimensional video in a top-and-bottom format.

A plurality of determination modes in which a video format is determined with regard to each of a plurality of three-dimensional video formats may be provided. And when input video is determined not to be three-dimensional video in a certain determination mode, the evaluation determination unit may determine whether or not the input video is three-dimensional video by switching to another determination mode.

During determination of a video format of a moving image, the evaluation determination unit may decide whether or not a determination state of a video format should be transitioned based on a determination result of a video format for a current frame, a determination state of a video format for the previous frame, and a time elapsed from a change in the determination result.

The evaluation determination unit may set a threshold value to be used in determining an evaluation value according to a determination state of a video format.

Further, according to an embodiment of the present disclosure, there is provided a video format determination device including a video input unit that receives video having a feature amount for each pixel, a region representative value calculation unit that divides a left-eye video region and a right-eye video region in a three-dimensional video format to be determined in input video into small regions having M rows and N columns, respectively, and then computes representative values of feature amounts of the respective small regions for each of the left-eye video region and the right-eye video region, a representative value ranking calculation unit that calculates rankings of the small regions for each row and each column based on the computed representative values in each of the left-eye video region and the right-eye video region, and an evaluation determination unit that evaluates a degree of similarity of rankings of corresponding small regions between the left-eye video region and the right-eye video region to determine whether or not the input video is in the three-dimensional video format.

Further, according to an embodiment of the present disclosure, there is provided a video format determination device including a video input unit that receives video having a feature amount for each pixel, a region representative value calculation unit that divides a left-eye video region and a right-eye video region in a three-dimensional video format to be determined in input video into small regions having M rows and N columns, respectively, and then computes representative values of feature amounts of the respective small regions for each of the left-eye video region and the right-eye video region, a representative value direction calculation unit that calculates directions in which the representative values change in each of the small regions in each of the left-eye video region and the right-eye video region, and an evaluation determination unit that further evaluates a degree of similarity of directions in which the representative values change in corresponding small regions in the left-eye video region and the right-eye video region to determine whether or not the input video is in the three-dimensional video format.

By multiplying a weighting filter coefficient of n×m by each of n×m small regions in each of the left-eye video region and the right-eye video region, the representative value direction calculation unit may calculate the directions in which the representative values change in each of the small regions.

Further, according to an embodiment of the present disclosure, there is provided a video format determination method including receiving video having a feature amount for each pixel, dividing a left-eye video region and a right-eye video region in a three-dimensional video format to be determined in input video into small regions having M rows and N columns, respectively, and then computing representative values of feature amounts of the respective small regions for each of the left-eye video region and the right-eye video region, calculating a correction value to correct the representative values based on an average value of feature amounts of the left-eye video region and an average value of feature amounts of the right-eye video region, correcting the representative values of the respective small regions computed for one of the left-eye video region and the right-eye video regions using the correction value, calculating the correlation between the left- and right-eye video regions by cumulatively adding differences of the representative values of corresponding small regions in the left-eye video region and the right-eye video region, and evaluating the correlation between the left- and right-eye video regions to determine whether input video is in the three-dimensional video format.

Further, according to an embodiment of the present disclosure, there is provided a video format determination method including receiving video having a feature amount for each pixel, dividing a left-eye video region and a right-eye video region in a three-dimensional video format to be determined in input video into small regions having M rows and N columns, respectively, and then computing representative values of feature amounts of the respective small regions for each of the left-eye video region and the right-eye video region, calculating the correlation between the left- and right-eye video regions by cumulatively adding differences of the representative values of corresponding small regions in the left-eye video region and the right-eye video region, calculating the correlation within at least one region of the left-eye video region and the right-eye video region, and calculating an evaluation value based on a ratio of the correlation between the left- and right-eye video regions to the correlation within the region to determine whether input video is in the three-dimensional video format based on the evaluation value.

Further, according to an embodiment of the present disclosure, there is provided a video format determination method including receiving video having a feature amount for each pixel, dividing a left-eye video region and a right-eye video region in a three-dimensional video format to be determined in input video into small regions having M rows and N columns, respectively, and then computing representative values of feature amounts of the respective small regions for each of the left-eye video region and the right-eye video region, calculating rankings of the small regions for each row and each column based on the computed representative values in each of the left-eye video region and the right-eye video region, and evaluating a degree of similarity of rankings of corresponding small regions between the left-eye video region and the right-eye video region to determine whether or not the input video is in the three-dimensional video format.

Further, according to an embodiment of the present disclosure, there is provided a video format determination method including receiving video having a feature amount for each pixel, dividing a left-eye video region and a right-eye video region in a three-dimensional video format to be determined in input video into small regions having M rows and N columns, respectively, and then computing representative values of feature amounts of the respective small regions for each of the left-eye video region and the right-eye video region, calculating directions in which the representative values change in each of the small regions in each of the left-eye video region and the right-eye video region, and evaluating a degree of similarity of directions in which the representative values change in corresponding small regions in the left-eye video region and the right-eye video region to determine whether or not the input video is in the three-dimensional video format.

Further, according to an embodiment of the present disclosure, there is provided a display device including an input unit that receives video signals, a video signal processing unit that determines the format of input video signals, and performs processing of a three-dimensional video signal or a two-dimensional video signal by switching display formats according to the determination result, and a display unit that displays video signals that have been processed in the video signal processing unit on a screen. The video signal processing unit divides a left-eye video region and a right-eye video region in a three-dimensional video format to be determined in input video into small regions having M rows and N columns, respectively, and then computes representative values of feature amounts of the respective small regions for each of the left-eye video region and the right-eye video region, calculates a correction value to correct the representative values based on an average value of feature amounts of the left-eye video region and an average value of feature amounts of the right-eye video region, calculates a correction value to correct the representative values based on an average value of feature amounts of the left-eye video region and an average value of feature amounts of the right-eye video region using the correction value, calculates the correlation between the left- and right-eye video regions by cumulatively adding differences of the representative values of corresponding small regions in the left-eye video region and the right-eye video region, and evaluates the correlation between the left- and right-eye video regions to determine whether input video is in the three-dimensional video format.

According to the technology disclosed in the present specification, it is possible to provide an excellent video format determination device, video format determination method, and video display device that can reliably realize determination of a three-dimensional video format or a two-dimensional video format with a small calculation amount, and is not influenced by various kinds of capturing methods and video content.

Other objects, characteristics, and advantages of the technology disclosed in the present specification may be clarified by further detailed description with reference to embodiments to be described below and the accompanying drawings.

BRIEF DESCRIPTION OF THE DRAWINGS

FIG. 14 is a diagram showing results obtained by calculating representative values of each small region in an input image shown in FIG. 13;

FIG. 15 is a diagram showing results obtained by calculating ranking of luminance in the calculation results of the representative values of each small region shown in FIG. 14;

FIG. 16 is a diagram showing eight masks used in template matching of Prewitt;

DETAILED DESCRIPTION OF THE EMBODIMENT(S)

Figure 1:
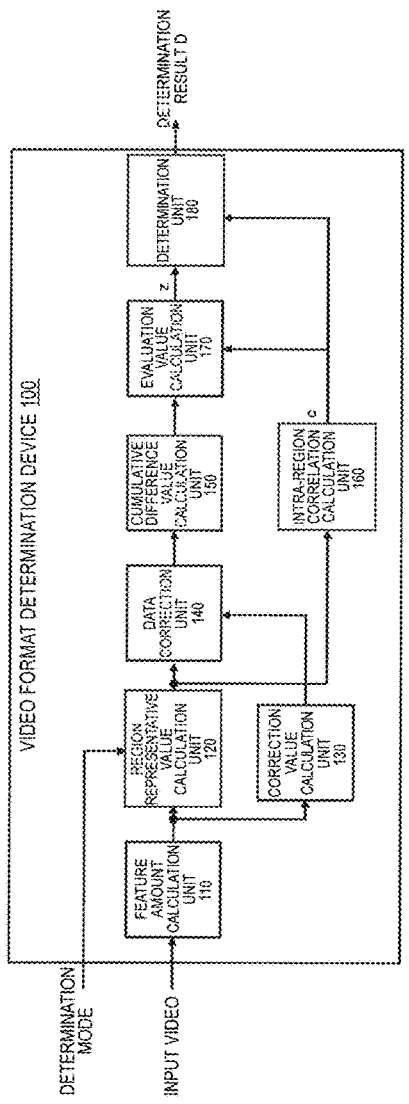
FIG. 1 is a diagram showing an internal configuration of a video format determination device 100 installed inside a video signal processing unit 2001.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Figure 20:
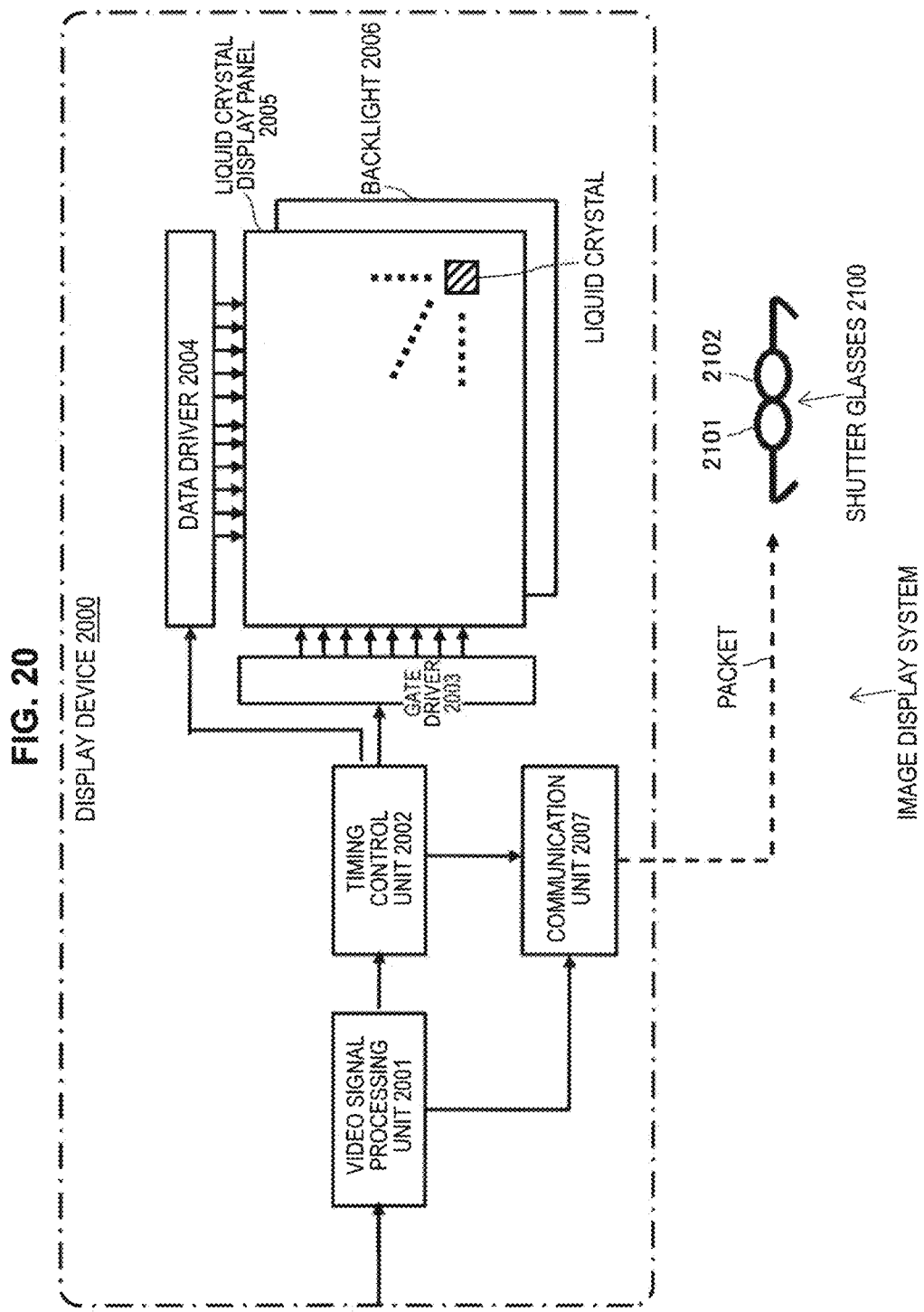
FIG. 20 is a diagram schematically showing a configuration example of a video display system to which the technology disclosed in the present specification can be applied.

FIG. 20 schematically shows a configuration example of a video display system to which the technology disclosed in the present specification can be applied. The video display system shown in the drawing includes a combination of a display device 2000 for three-dimensional display (stereoscopic vision) and shutter glasses 2100 equipped with shutter mechanisms in each of a left eye part and a right eye part. Hereinafter, a liquid crystal display (LCD) will be used as the display device 2000 to display three-dimensional images. However, the gist of the technology disclosed in the present specification is not necessarily limited to a liquid crystal display.

The display device 2000 alternately displays left-eye videos L and right-eye videos R in a time division manner. On the other hand, the shutter glasses 2100 are synchronized with switching timings of the left-eye videos L and the right-eye videos R on the display device 2000 side so as to perform switching to opening and closing of left and right shutter lenses 2101 and 2102. In communication between the display device 2000 and the shutter glasses 2100, a wireless network using radio wave communication such as Wi-Fi, IEEE802.15.4, or the like is used so that packets in which information necessary for controlling opening and closing timings of the left and right shutter lenses 2101 and 2102 is described are transmitted from the display device 2000 to the shutter glasses 2100. Of course, infrared communication or communication methods other than the wireless network can be applied thereto.

The display device 2000 includes a video signal processing unit 2001, a timing control unit 2002, a gate driver 2003, a data driver 2004, a liquid crystal display panel 2005, and a communication unit 2007.

The liquid crystal display panel 2005 includes a liquid crystal layer and transparent electrodes which face each other with the liquid crystal layer interposed therebetween, color filters, and the like (none of which is shown). In addition, on the back side of the liquid crystal display panel 2005, a backlight (surface light source) 2006 is disposed. The backlight 2006 includes LEDs (Light Emitting Diodes), and the like having satisfactory persistence characteristics.

In the video signal processing unit 2001, an image quality correction process for enhancing sharpness of video images and improving contrast is performed.

In addition, in the video signal processing unit 2001, a video format determination device to be described later is installed so as to switch display formats of input video signals based on a determination result of a video format. In other words, it is determined whether an input video signal is a two-dimensional video signal or a three-dimensional video signal, and when the signal is a three-dimensional video signal, the format thereof is determined. Then, when the input signal is determined to be a three-dimensional video signal, the signal is separated into left-eye video images L and right-eye video images R, and correctly arranged along the time axis, and left and right video signals are output in order to alternately display the left-eye video images L and the right-eye video images R on the liquid crystal display panel 2005 in a time division manner.

Left-eye video signals and right-eye video signals which are converted in the video signal processing unit 2001 are input to the timing control unit 2002. The timing control unit 2002 converts the input left-eye video signals and right-eye video signals into signals to be input to the liquid crystal display panel 2005, and generates pulse signals used to cause a panel driving circuit that includes the gate driver 2003 and the data driver 2004 to operate.

The gate driver 2003 is a drive circuit that generates signals for sequential driving, and outputs a driving voltage to gate bus lines connected to each pixel in a display panel 134 according to signals transmitted from the timing control unit 2002. In addition, the data driver 2004 is a drive circuit that outputs driving voltages based on video signals, and generates and outputs signals applied to data lines based on signals transmitted from the timing control unit 2002.

In addition, in order to compensate for response speed of the liquid crystal display panel 2005, over-driving is appropriately performed. Over-driving is a process for improving response characteristics of the panel by applying a driving voltage equal to or higher than a target voltage of the panel drive circuit to liquid crystal elements so as to quickly reach the target voltage.

The communication unit 2007 operates as an access point in the wireless network such as Wi-Fi, or IEEE802.15.4, and includes one or more shutter glasses 2100 operating as terminals in its own basic service set (BSS). The communication unit 2007 transmits packets in which information necessary for controlling opening and closing timings of the left and right shutter lenses 2101 and 2102 on the shutter glasses 2100 side is described.

Figure 21:
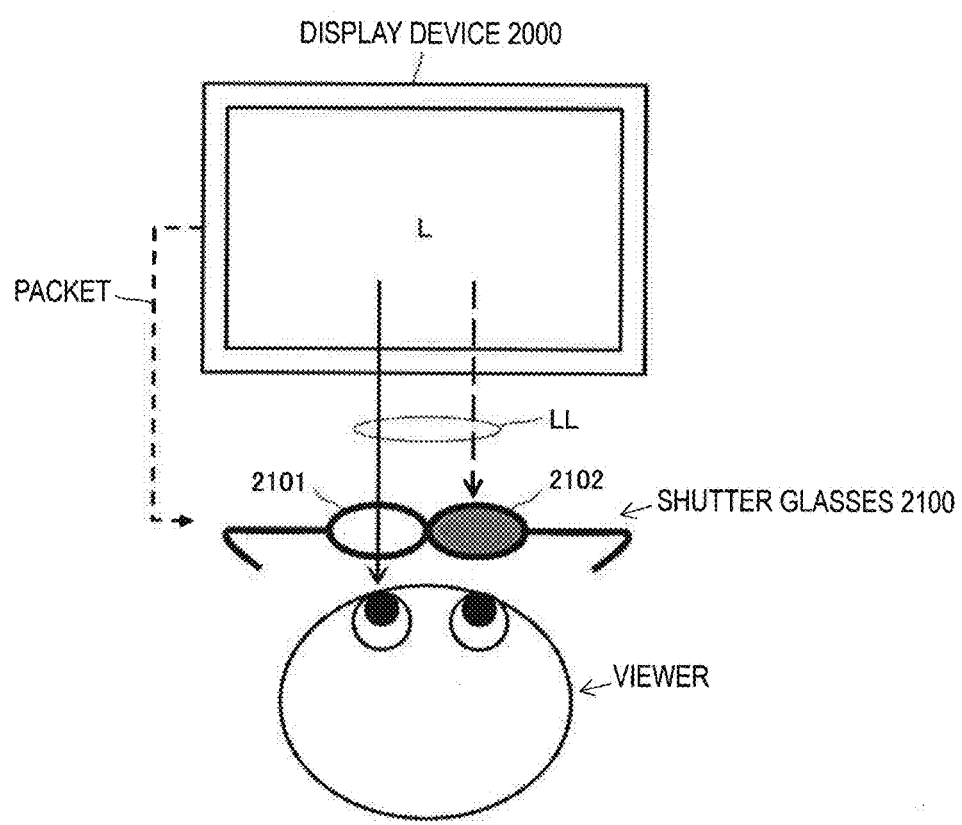
FIG. 21 is a diagram showing a control operation of right and left shutter lenses 2101, 2102 of shutter glasses 2100 that are synchronized with a display period of a left-eye video image L of a display device 2000.

FIG. 21 shows a control operation of the left and right shutter lenses 2101 and 2102 of the shutter glasses 2100 that are synchronized with a display period of a left-eye video image L of the display device 2000. As shown in the drawing, during the display period of the left-eye video image L, the left shutter lens 2101 is set to be in an open state and the right shutter lens 2102 to be in a closed state according to synchronization packets wirelessly transmitted from the display device 2000 side, and display light LL based on the left-eye video image L reaches the left eye of a user.

Figure 22:
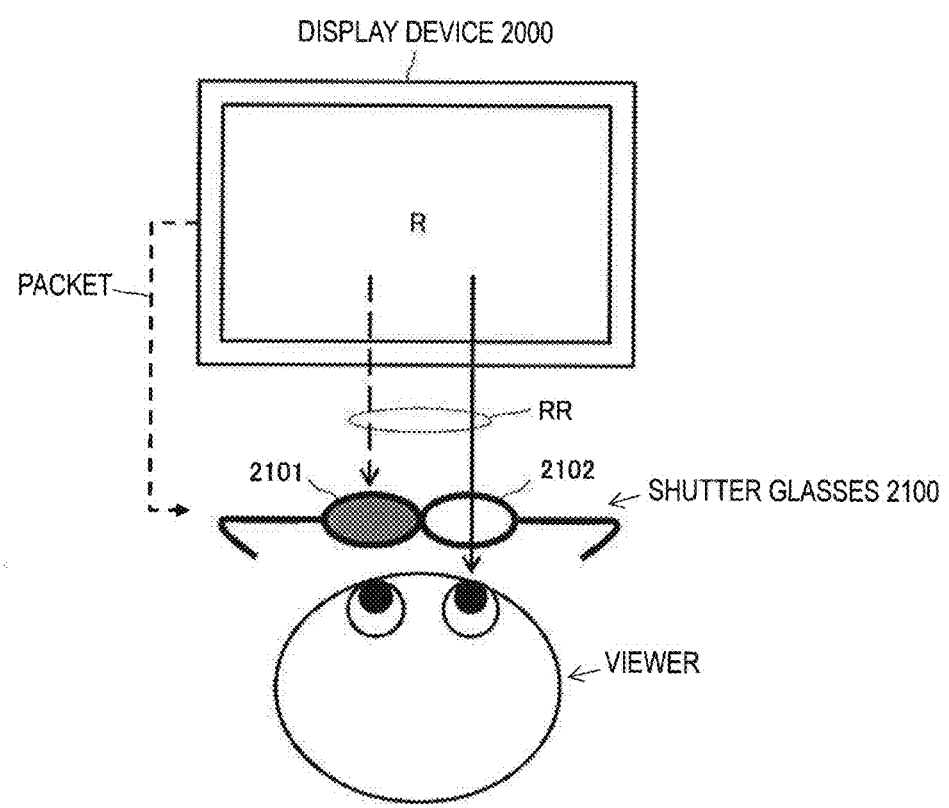
FIG. 22 is a diagram showing a control operation of the right and left shutter lenses 2101, 2102 of the shutter glasses 2100 that are synchronized with a display period of a right-eye video image R of the display device 2000.
Figure 23:
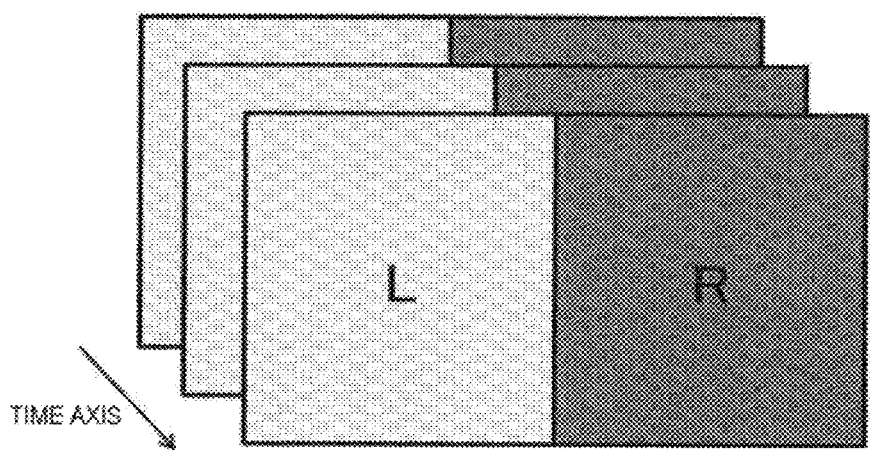
FIG. 23 is a diagram showing a three-dimensional video format in the side-by-side format.
Figure 24:
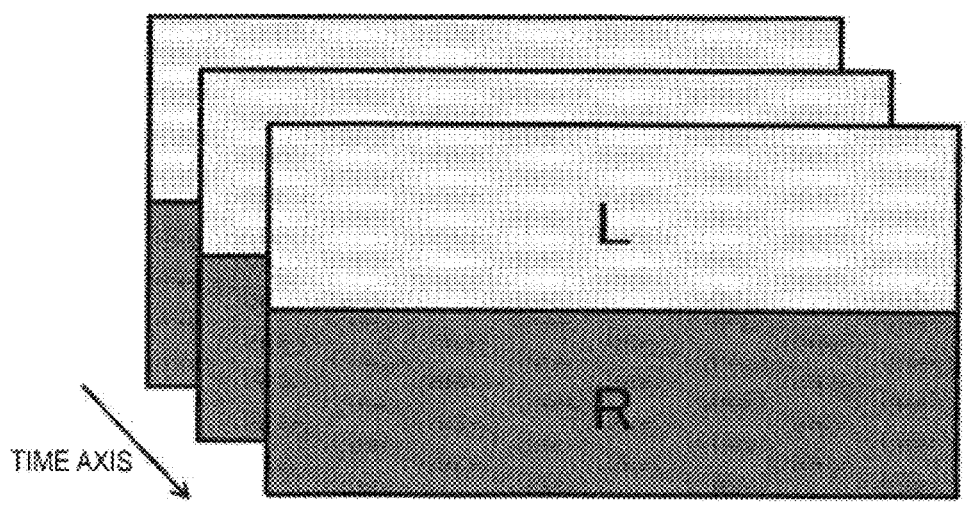
FIG. 24 is a diagram showing a three-dimensional video format in the top-and-bottom format.
Figure 25:
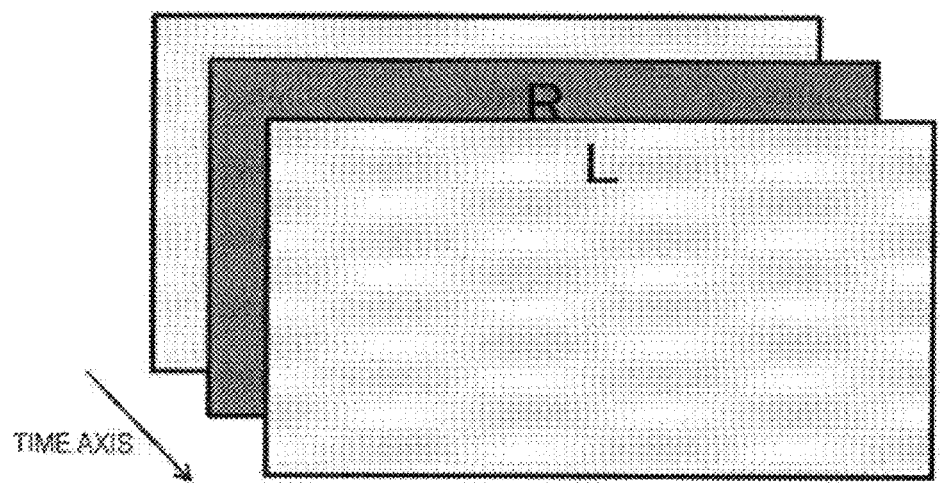
FIG. 25 is a diagram showing a three-dimensional video format in the frame sequential format.
Figure 26:
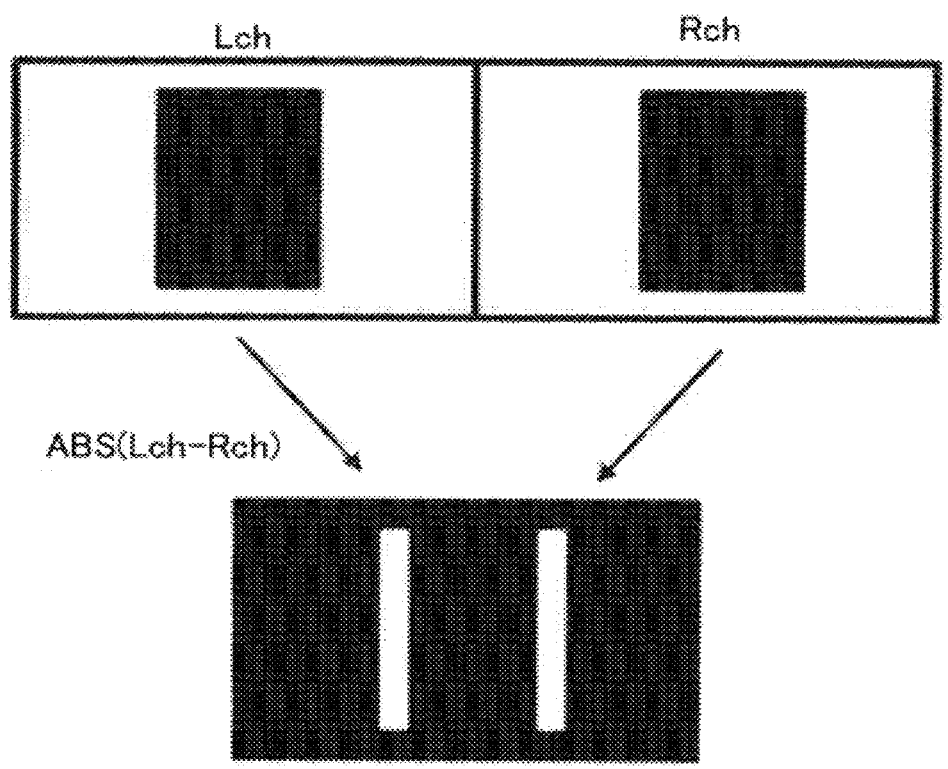
FIG. 26 is a diagram exemplifying a case in which a stereo video having parallax between left and right videos is erroneously determined as a two-dimensional video.
Figure 27:
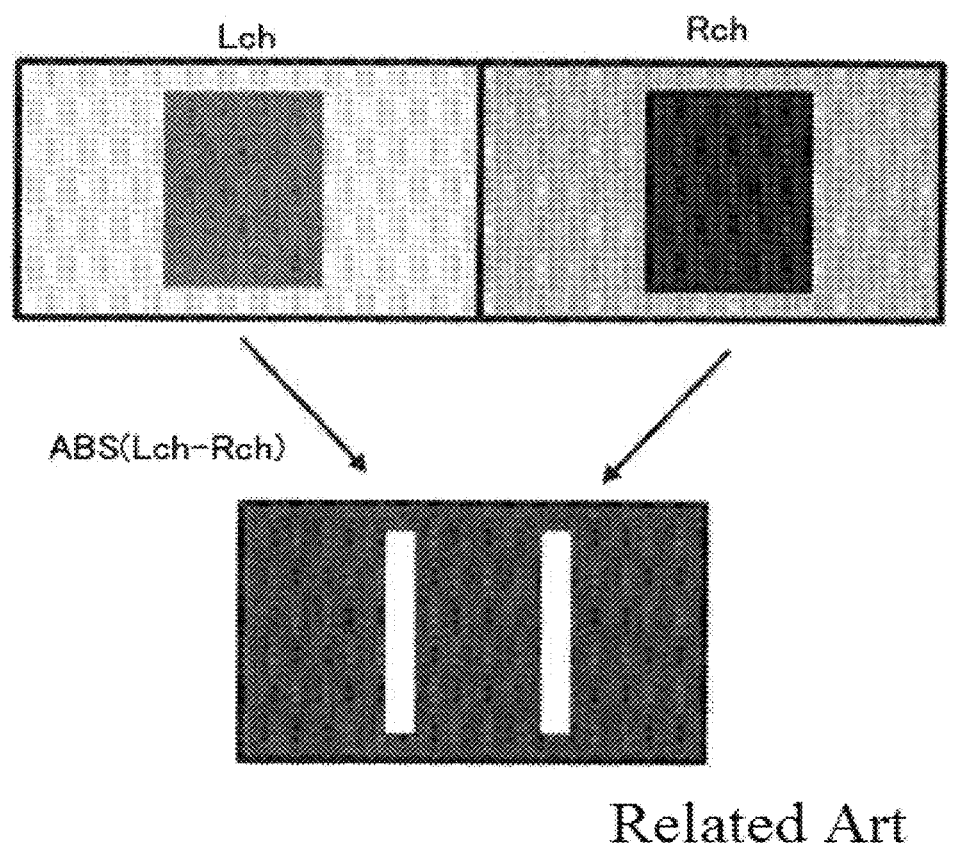
FIG. 27 is a diagram exemplifying a case in which a three-dimensional video is erroneously determined as a two-dimensional video due to the difference in luminance and contrast of left and right videos.

In addition, FIG. 22 shows a control operation of the left and right shutter lenses 2101 and 2102 of the shutter glasses 2100 that are synchronized with a display period of a right-eye video image R. As shown in the drawing, during the display period of the right-eye video image R, the right shutter lens 2102 is set to be in an open state and the left shutter lens 2101 to be in a closed state, and display light RR based on the right-eye video image R reaches the right eye of the user.

The display device 2000 alternately displays the left-eye video image L and the right-eye video image R on the liquid crystal display panel 2005 by each field in a time division manner. On the shutter glasses 2100 side, the left and right shutter lenses 2101 and 2102 are synchronized with switching of video images of each field of the display device 2000 and alternately perform opening and closing operations. The brain of the user who observes displayed images through the shutter glasses 2100 fuses the left-eye video images L and the right-eye video images R and thereby three-dimensionally recognizes the video images displayed on the display device 2000.

Note that the technology disclosed in the present specification can be applied not only to the three-dimensional video display format using active glasses such as the shutter glasses 2100 as described above but also to a three-dimensional video display format for the naked eye and to a three-dimensional video display format using passive glasses.

FIG. 1 shows an internal configuration of a video format determination device 100 installed inside the video signal processing unit 2001. The video format determination device 100 shown in the drawing receives a video signal, selects a side-by-side determination mode or a top-and-bottom determination mode according to determination mode, and obtains a determination result D.

Herein, the video signal input to the video format determination device 100 is assumed to be a video signal having resolution of, for example, an HD (High Definition) signal of 60 Hz having a pixel size of 1920×1080, an SD (Standard Definition) signal having a pixel size of 720×480, or a still image signal recorded by a digital camera. FIG. 1 shows a configuration example in which a process for determining a video format for one frame of a still image is performed, but in the case of a video signal, a video format can be determined by processing one frame out of a moving image of which frames are consecutively input.

The video format determination device 100 includes a feature amount calculation unit 110, a region representative value calculation unit 120, a correction value calculation unit 130, a data correction unit 140, a cumulative difference value calculation unit 150, an intra-region correlation calculation unit 160, an evaluation value calculation unit 170 and a determination unit 180.

The feature amount calculation unit 110 calculates a feature amount when a video format is determined based on an input video signal. To calculate the feature amount, a method of excluding high-frequency information using a low-frequency pass filter, and a method of acquiring edge information using a band-pass filter or slope calculation based on the differences between adjacent pixels are considered, but any method may be used. In addition, particularly, a luminance value of input video may be used as it is without calculating a feature amount. Hereinbelow, a luminance value of input video is set to be used as a feature amount as it is.

The region representative value calculation unit 120 divides a left-eye video region and a right-eye video region in a video frame respectively into a plurality of small regions according to determination modes (in other words, according to a three-dimensional video format to be determined), and then computes a representative value of feature amounts calculated by the feature amount calculation unit 110 for each small region. Herein, as a representative value, an average value of feature amounts (luminance values) of each region is calculated. Which three-dimensional video format should be determined is instructed automatically or manually by a user from, for example, the outside of the video format determination device 100.

Figure 2:
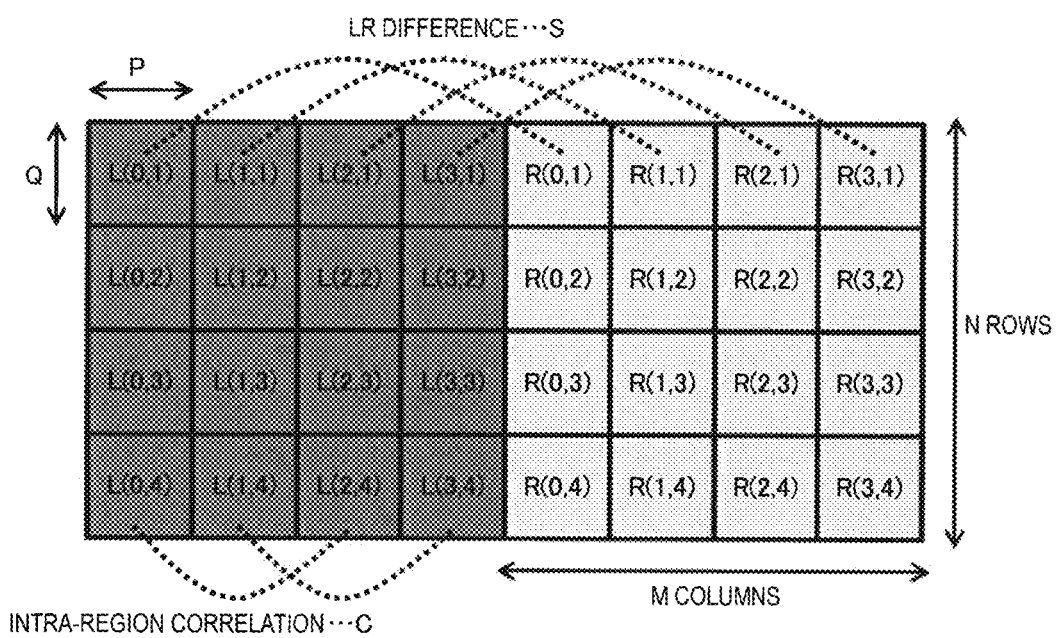
FIG. 2 is a diagram showing an example in which an input video is divided in a determination mode for determining a three-dimensional video format in the side-by-side format.

When the determination mode in which the side-by-side three-dimensional video format is determined is set, for example, the region representative value calculation unit 120 divides the input video into two halves on the left and right sides, and then divides respective left and right regions into M×N small regions, in other words, into 2M×N small regions in total as shown in FIG. 2.

Next, the region representative value calculation unit 120 computes an average value from feature amounts of each of the small regions as, for example, a representative value of the small regions. The average value of small regions L(p, q) and R(p, q) on the respective left and right sides shown in FIGS. 2 and 3 can be calculated as shown in the following formulas (1) and (2).

$$L(p, q) = \frac{1}{P \times Q} \sum_{x=(p \times P)}^{P-1} \sum_{y=(q \times Q)}^{Q-1} F(x, y) \quad (1)$$

$$R(p, q) = \frac{1}{P \times Q} \sum_{x=(p \times P)+(M \times P)}^{P-1} \sum_{y=(q \times Q)}^{Q-1} F(x, y) \quad (2)$$

Wherein, each of the variables in the above formulas (1) and (2) is defined as follows.

L(p, q): A representative value of the small regions for a left-eye video image

R(p, q): A representative value of the small regions for a right-eye video image F(x, y): A feature amount (luminance value) in a unit of a pixel of input video x: A horizontal pixel position of input video, y: A vertical pixel position of input video X: The number of horizontal pixels of F(x, y), Y: The number of vertical lines of F(x, y)

M: The number of divided regions of respective left and right video regions in the horizontal direction N: The number of divided regions of respective left and right video regions in the vertical direction P: The number of horizontal pixels in each of the divided regions (P=X/M)

Figure 3:
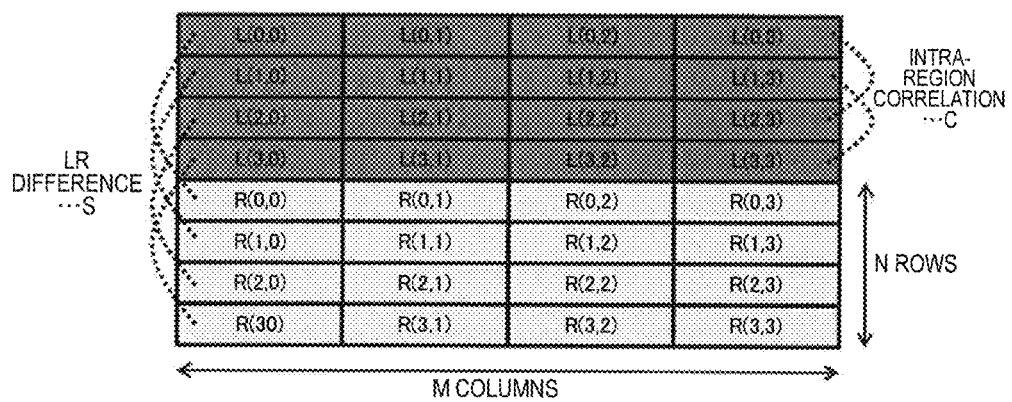
FIG. 3 is a diagram showing an example in which an input video is divided in a determination mode for determining a three-dimensional video format in the top-and-bottom format.

Q: The number of vertical pixels in each of the divided regions (Q=Y/N)

p: A horizontal pixel position in a unit of a small region, q: A vertical pixel position in a unit of a small region In addition, when a determination mode in which the top-and-bottom three-dimensional video format is determined is set, the region representative value calculation unit 120 divides input video into two halves on the upper and lower sides, and then divides the respective upper and lower regions into M×N small regions, in other words, into M×2N small regions in total as shown in FIG. 3. Then, the region representative value calculation unit 120 computes an average value from feature amounts of the small regions as, for example, the representative value of the small regions.

Figure 4:
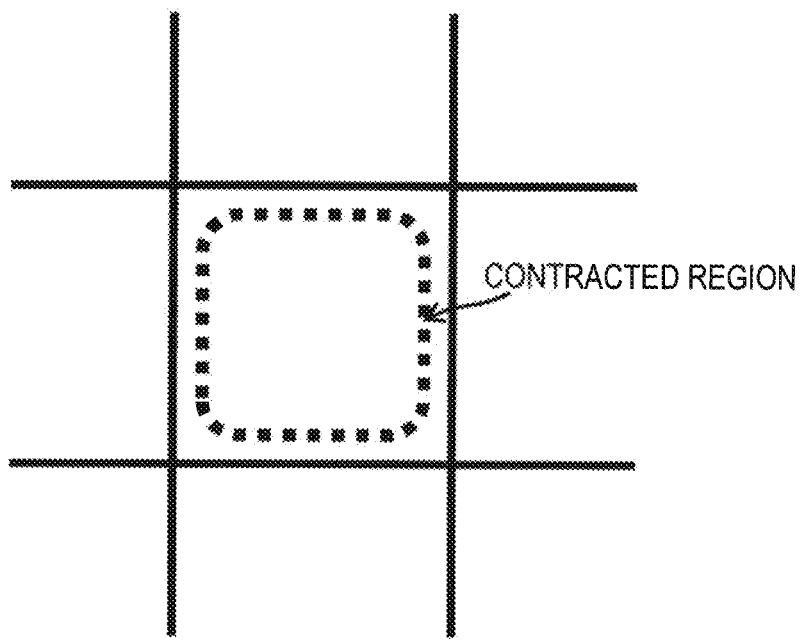
FIG. 4 is a diagram exemplifying another method for dividing an input video.
Figure 5:
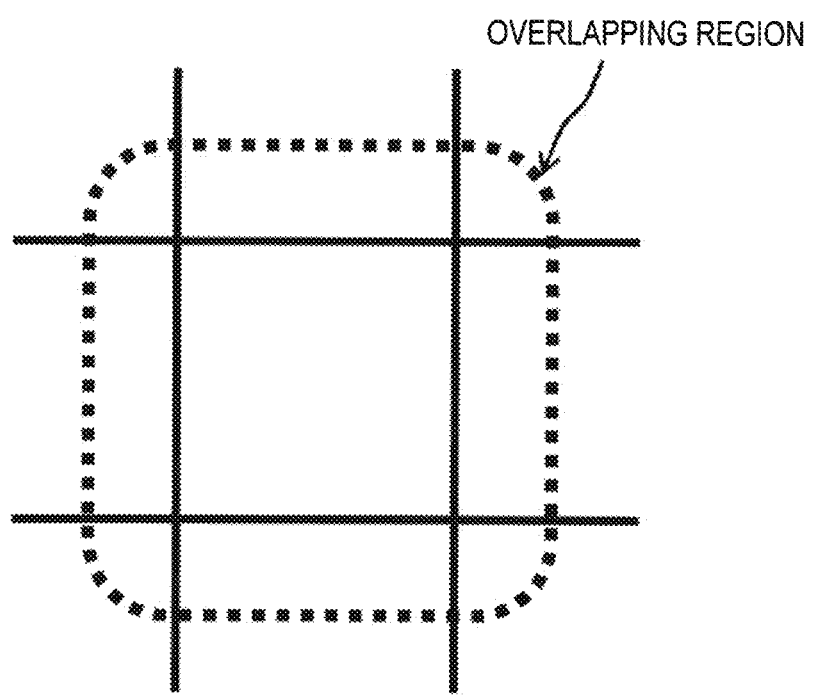
FIG. 5 is a diagram exemplifying another method for dividing an input video.

Note that, as methods for dividing input video, a method in which contracted regions of blocks obtained by dividing a left-eye video region and a right-eye video region so as to respectively have M rows and N columns are used (refer to FIG. 4), and a method in which an overlapping region with adjacent blocks is used (refer to FIG. 5) are exemplified, in addition to the method in which the regions are clearly divided into blocks as shown in FIGS. 2 and 3.

In addition, the number of divisions within the range not affected by parallax is also a characteristic of the technology disclosed in the present specification. In other words, in the examples shown in FIGS. 2 and 3, the number of M×N divisions is set to 4×4 divisions for each of the left-eye video region and the right-eye video region, but a sufficiently rough number such as 16×16 divisions, 12×12 divisions, or 8×8 divisions is another characteristic thereof. A number of divisions that is asymmetric in the horizontal direction and the vertical direction such as 16×8 divisions may be used. In this manner, by using a sufficiently rough number of divisions for input video, the influence of noise or bands of video signals as well as the influence of parallax can be eliminated, and at the same time, a calculation amount can be reduced.

The correction value calculation unit 130 calculates, for a feature amount of input resolution supplied from the feature amount calculation unit 110, average values APL_L and APL_R of feature amounts (luminance values) of each of the left and right video regions respectively as representative values of the regions as shown in the following formulas (3) and (4), separate from the calculation of the representative value for the small regions in the region representative value calculation unit 120.

$$APL\_L = \frac{1}{X/2 \times Y} \sum_{x=0}^{X/2-1} \sum_{y=0}^{Y-1} F(x, y) \qquad (3)$$

$$APL\_R = \frac{1}{X/2 \times Y} \sum_{x=X/2}^{X-1} \sum_{y=0}^{Y-1} F(x, y) \qquad (4)$$

Then, the difference between the calculated values APL_L and APL_R is computed as a correction value a shown in the following formula (5), and supplied to the data correction unit 140 in the latter stage.

$$\alpha = APL\_L - APL\_R \qquad (5)$$

When the representative value L(p, q) of each small region in the left-eye video region is acquired from the region representative value calculation unit 120, the data correction unit 140 corrects the value according to the following formula (6) using the correction value a supplied from the correction value calculation unit 130, and then acquires a representative value L'(p, q) after correction.

$$L'(p,q) = L(p,q) - \alpha \qquad (6)$$

With an operation of the representative values shown in the above formula (6), the influence of luminance, contrast, and γ (differences between the left and right video regions attributable to the differences of characteristics of left and right cameras) can be eliminated for three-dimensional video acquired using a twin lens camera.

The cumulative difference value calculation unit 150 obtains a cumulative sum S obtained by weighting the difference of the representative values of the corresponding small regions between the left- and right-eye video regions. However, as the representative value of each small region on the left-eye video region side, the correction value L'(p, q) obtained in the data correction unit 140 is used. The cumulative sum S can be calculated according to the following formula (7), and the sum serves as a correlation value S between the left-eye and right-eye video regions in the video.

$$S = \sum_{p=0}^{M-1} \sum_{q=0}^{N-1} W(L'(p, q) - R(p, q)) \qquad (7)$$

Figure 6:
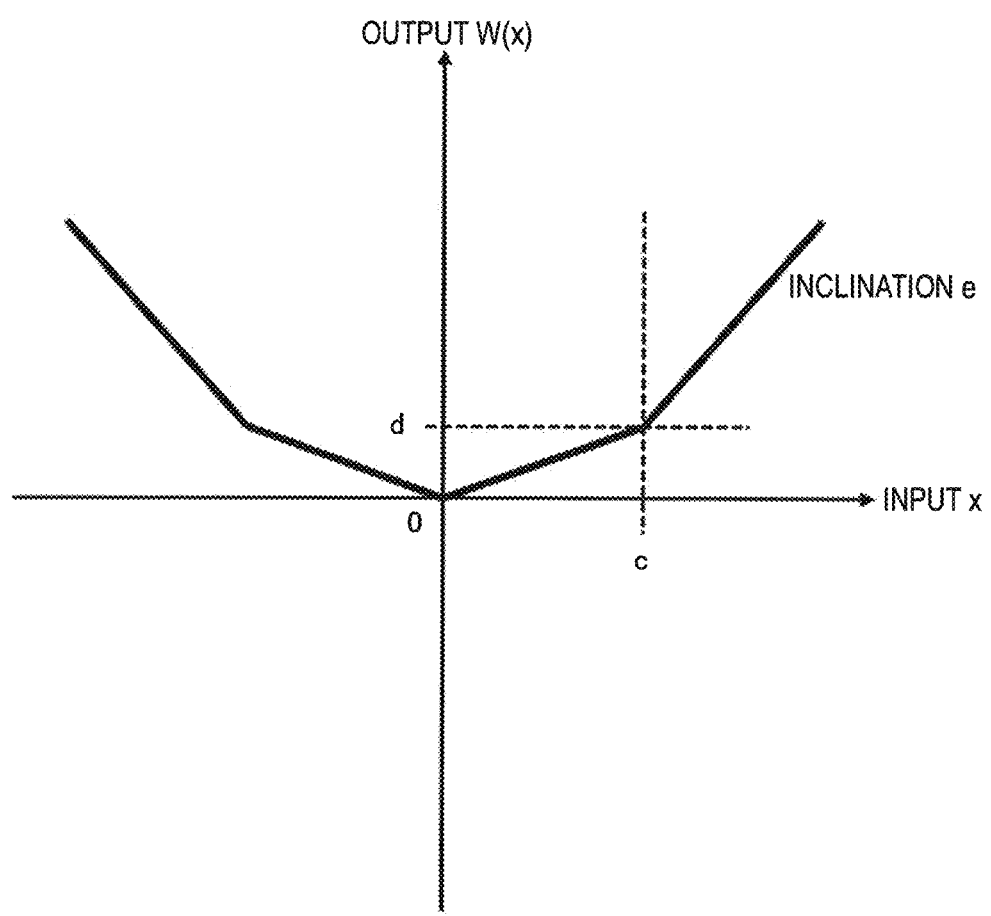
FIG. 6 is a diagram showing an example of a weighting function used in cumulative difference calculation.

Note that, as a weight W (in the above formula (7)) given to the difference of representative values of corresponding small regions of the left- and right-eye video regions, a weighting function that suppresses addition of a difference that is equal to or lower than a predetermined value is used. Specifically, a weighting function as shown in FIG. 6 and the following formula (8) can be used. The weighting function W shown in the drawing is placed with an extremely small weight for an input x that is equal to or lower than a predetermined value c. Thus, when a difference value L'(p, q)−R(p, q) used as the input x decreases as the value is affected by parallax, luminance, and noise caused by photographing using a twin lens camera, addition to a correlation value S is suppressed. As a result, effects of eliminating the influence of parallax and the like and increasing determination accuracy of a three-dimensional video format can be further expected than when a correlation value is calculated simply as an absolute difference value.

$$\left. \begin{array}{l} W(x) = d/c \times |x| \qquad \text{(When } 0 \le |x| < c\text{)} \\ W(x) = e \times |x| + (d - e \times c) \qquad \text{(When } c \le |x|\text{)} \end{array} \right\} \qquad (8)$$

The intra-region correlation calculation unit 160 calculates the correlativity of each video signal within the left- and right-eye video regions. For an intra-region correlation C for the whole video, either of an intra-region correlation value CL obtained in the left-eye video region and an intra-region correlation value CR obtained in the right-eye video region may be used, or the intra-region correlation C may be obtained from the average of CL and CR as shown in the following formula (9).

$$C = (CL + CR)/2 \qquad (9)$$

Herein, the intra-region correlation CL in the left-eye video region and the intra-region correlation value CR in the right-eye video region can be respectively obtained according to the following formulas (10) and (11).

$$CL = \sum_{p=0}^{M/2-1} \sum_{q=0}^{N-1} |L(p, q) - L(p + M/2, q)| \qquad (10)$$

$$CR = \sum_{p=0}^{M/2-1} \sum_{q=0}^{N-1} |R(p, q) - R(p + M/2, q)| \qquad (11)$$

The evaluation value calculation unit 170 calculates an evaluation value Z by obtaining the ratio of the correlation value S between the left- and right-eye video regions obtained by the cumulative difference value calculation unit 150 to the intra-region correlation C in the left- and the right-eye video regions obtained by the intra-region correlation calculation unit 160 according to the following formula (12).

$$Z = S/C \qquad (12)$$

The determination unit 180 determines whether the input video is of a three-dimensional video signal in the side-by-side format, or the like, or a two-dimensional video signal based on the computed evaluation value Z. When the input video is of a three-dimensional video format, the correlativity of the left-eye video region and the right-eye video region in the input video increases. In this case, since the correlation value S between the regions shown in the above formula (7) becomes small, the evaluation value shown in the above formula (12) decreases. Thus, the determination unit 180 can determine that the input video is of a three-dimensional video format if the evaluation value Z output from the evaluation value calculation unit 170 is low.

Figure 7:
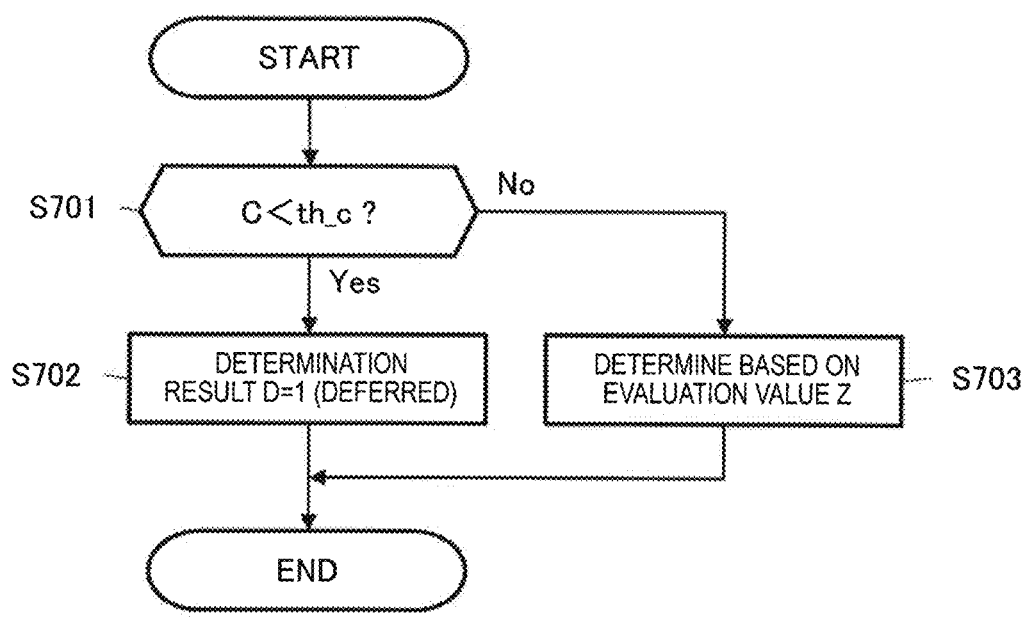
FIG. 7 is a flowchart showing a process of a determination unit 180 for determining a video format of an input video based on an evaluation value Z.

FIG. 7 shows a process of the determination unit 180 for determining a video format of the input video based on the evaluation value Z in the form of a flowchart. The determination unit 180 is set to show a determination result as a value of D (a value of D or 0: three-dimensional video, 1: determination deferred).

The determination unit 180 first checks whether the intra-region correlation C computed by the intra-region correlation calculation unit 160 is equal to or higher than a predetermined threshold value th_c (Step S701).

At this moment, when the intra-region correlation C is less than the predetermined threshold value th_c (Yes in Step S701), the determination result D is output as 1, in other words, determination is deferred (Step S702). When the intra-region correlation C has a value close to 0, the reason is that there is a high possibility that the entire screen is flat, and thus there is not sufficient information for determining a video format.

On the other hand, when the intra-region correlation C is equal to or higher than the threshold value th_c (No in Step S701), sufficient information for determining a video format can be obtained from the input video, and thus determination of a video formation is attempted based on the evaluation value Z computed by the evaluation value calculation unit 170 (Step S703).

Figure 8:
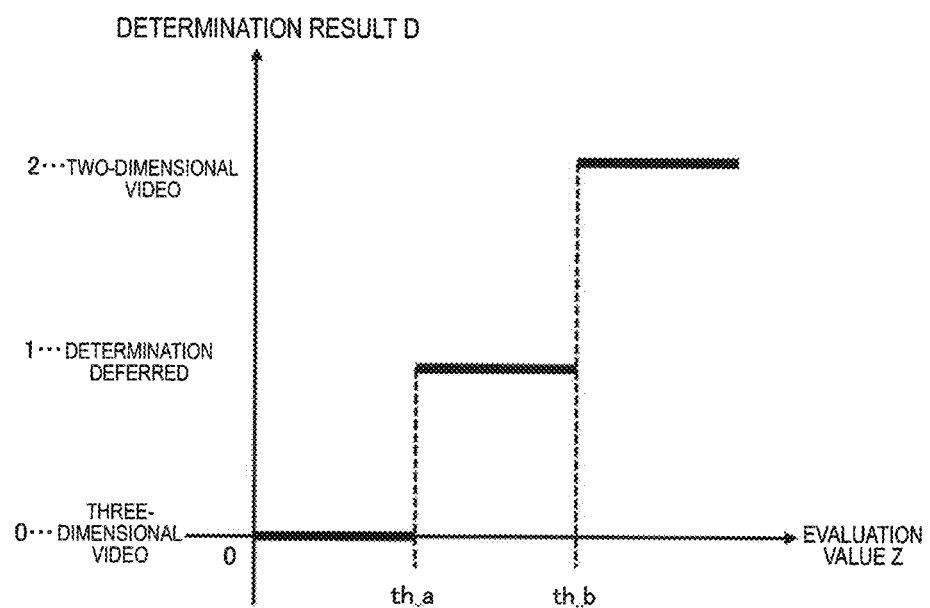
FIG. 8 is a diagram showing a determination processing method of a video format based on the evaluation value Z.

In the present embodiment, two threshold values of th_a and th_b are used in the determination process of a video format based on the evaluation value Z (wherein, th_a<th_b). FIG. 8 graphically explains a determination processing method of a video format based on the evaluation value Z.

If the evaluation value Z is low, the input video can be determined to be in a three-dimensional video format (as described above). Thus, when the evaluation value Z is smaller than the threshold value th_a, the determination unit 180 determines that the input video is three-dimensional video, and outputs 0 as the determination result D. On the other hand, when the evaluation value Z is equal to or greater than the threshold value th_b, the determination unit 180 determines that the input video is two-dimensional video, and outputs 2 as the determination result D. In addition, when the evaluation value Z is equal to or greater than th_a and smaller than th_b, the determination unit 180 defers determination, and outputs 1 as the determination result D.

Note that the threshold values th_a and th_b are determined to be values, for example, 0.2 and 0.4, or the like. In addition, determination of the evaluation value Z may be performed using positions of formulas having three or more stages (for example, 10 stages) rather than threshold values of two stages as shown in FIG. 8 so that reliability for the determination values is expressed in stages.

When a still image in the side-by-side format is desired to be determined in the video format determination device 100, a "side-by-side determination mode" is set as a determination mode. When the determination result D obtained from the video format determination device 100 is 0, which is for three-dimensional video, the image is determined to be in the side-by-side format, and when the result is 2, which is for two-dimensional video, the image is determined to be two-dimensional video. In addition, when the determination result D is 1, which is for deferment of determination, the image is determined to be two-dimensional video because there is also a possibility of erroneous determination.

In addition, when a still image in the top-and-bottom format is desired to be determined in the video format determination device 100, a "top-and-bottom determination mode" is set as a determination mode. When the determination result D obtained from the video format determination device 100 is 0, which is for three-dimensional video, the image is determined to be in the top-and-bottom format, and when the result is 2, which is for two-dimensional video, the image is determined to be two-dimensional video. In addition, when the determination result D is 1, which is for deferment of determination, the image is determined to be two-dimensional video because there is also a possibility of erroneous determination.

In addition, when there is no knowledge of whether the input video is of a three-dimensional video signal in either of the side-by-side format or the top-and-bottom format, or of a two-dimensional video signal, it is necessary for the video format determination device 100 to determine such a plurality of video formats.

Figure 9:
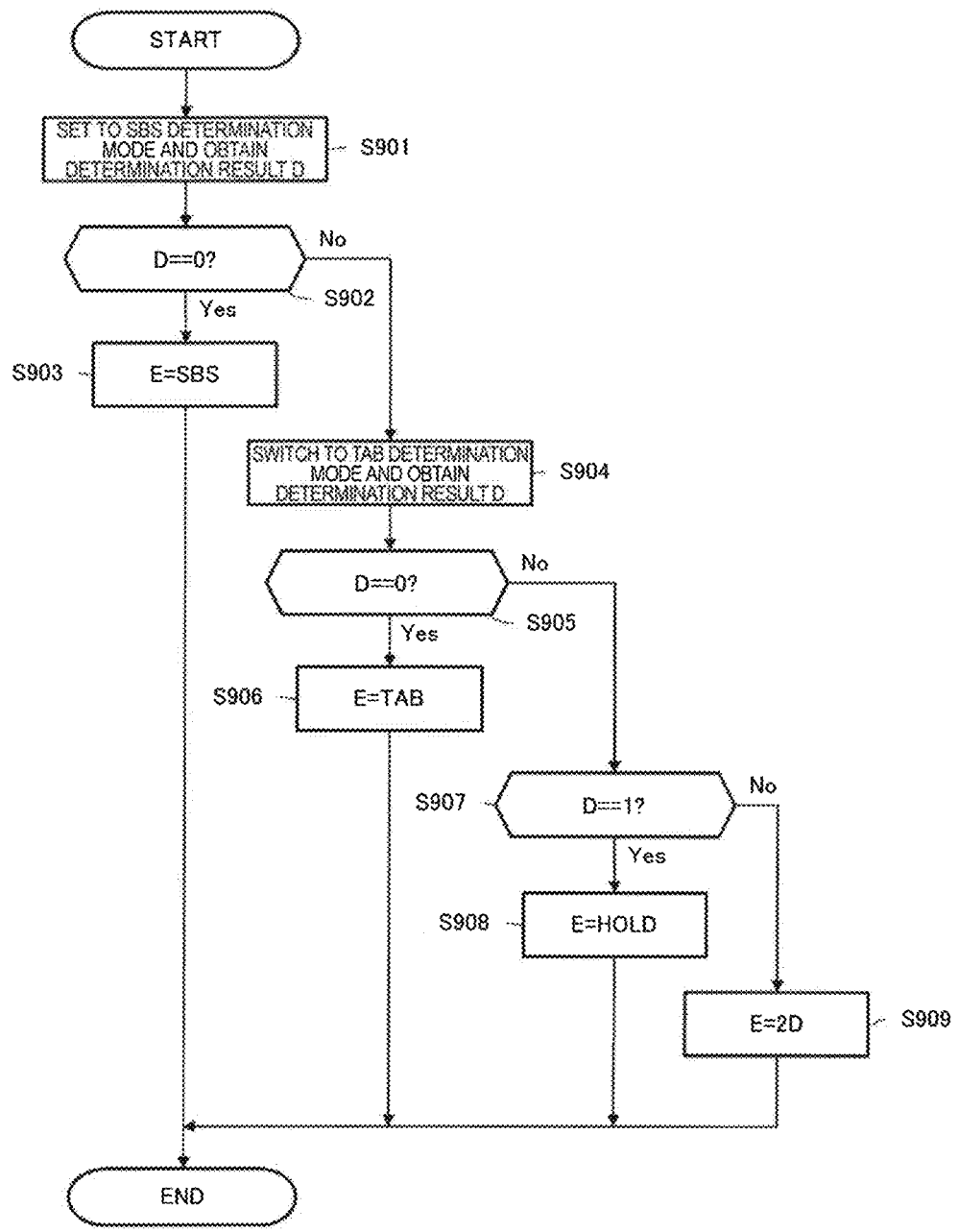
FIG. 9 is a flowchart showing a process of the determination unit 180 for determining a plurality of video formats based on the evaluation value Z.

FIG. 9 shows a process of the determination unit 180 for determining the plurality of video formats based on the evaluation value Z in the form of a flowchart.

First, by setting the determination mode to be the side-by-side (SBS) determination mode, a determination process is performed, and the determination result D is obtained (Step S901).

Herein, when the obtained determination result D is 0 (Yes in Step S902), a final determination result E=SBS which indicates that the format of the input video is the side-by-side format is output (Step S903), and then this process routine ends.

In addition, when the obtained determination result D is not 0 (No in Step S902), the determination mode is subsequently switched to the top-and-bottom (TAB) determination mode, the determination process is performed, and then the determination result D is obtained again (Step S904).

Herein, when the obtained determination result D is 0 (Yes in Step S905), a final determination result E=TAB which indicates that the format of the input video is the top-and-bottom format is output (Step S906), and then this process routine ends.

In addition, when the obtained determination result D is not 0 (No in Step S905), it is checked whether or not the determination result D is 1 (Step S907). Then, when D is 1 (Yes in Step S907), a final determination result E=HOLD which indicates that the determination is deferred is output (Step S908), and when D is not 1 (No in Step S907), a final determination result E=2D which indicates that the input video is in the two-dimensional video format is output (Step S909), and the process routine ends.

As described above, the display device 2000 mounted with the video format determination device 100 switches display formats of input video based on determination results of video formats. Herein, in the determination methods as shown in FIGS. 7 to 9, there is a possibility that determination results are switched for each frame. When input video is a moving image, if determination results change in a short period of time, display formats output on the screen of the display device 200 change very often, and thus there is concern that such changes cause viewers displeasure. Therefore, it is necessary to stabilize the intervals of determination results output from the video format determination device 100.

Figure 10:
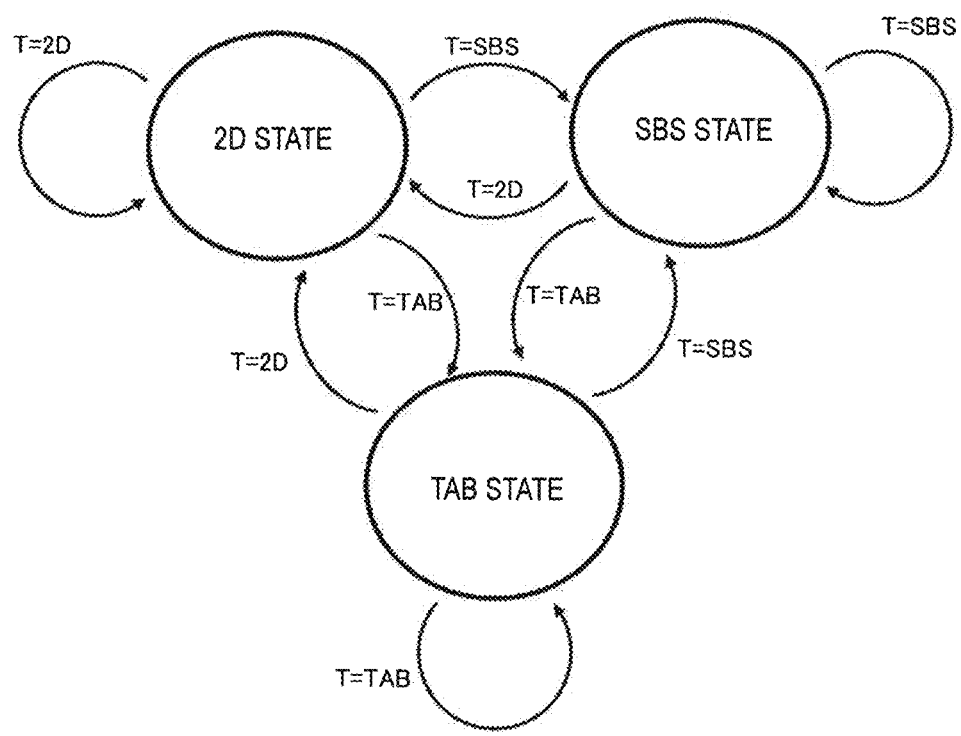
FIG. 10 is a state transition diagram used in operation control during video format determination of a moving image by the video format determination device 100.

FIG. 10 shows a state transition diagram used in operation control during video format determination of a moving image by the video format determination device 100. In the example shown, the video format determination device 100 has three kinds of states which are an "SBS state" in which input video is determined as three-dimensional video in the side-by-side format, a "TAB state" in which the video is determined as three-dimensional video in the top-and-bottom format, and a "2D state" in which the video is determined as two-dimensional video. In addition, the determination unit 180 determines state transition based on a determination result (E) of a current frame, a determination state (T) of the previous frame thereof, and a time elapsed (CNT) after the determination result is changed. Each state in the drawing is output from the video format determination device 100 as a final determination result of each video format. The initial state is set to be, for example, the 2D state.

In the 2D state, if the determination result of the current frame is maintained to be 2D, the state returns to the 2D state. On the other hand, if the determination result of the current frame is change to SBS and a predetermined period of time elapses (in other words, if the determination result is SBS over several consecutive frames), the state is transitioned from the 2D state to SBS. In addition, if the determination result of the current frame is changed to TAB and a predetermined period of time elapses, the state is transitioned from the 2D state to TAB.

In addition, in the SBS state, if the determination result of the current frame is maintained to be SBS, the state returns to the SBS state. On the other hand, if the determination result of the current frame is changed to TAB and a predetermined period of time elapses, the state is transitioned from the SBS state to the TAB state. In addition, if the determination result of the current frame is changed to 2D and a predetermined period of time elapses, the state is transitioned from the SBS state to the 2D state.

In addition, in the TAB state, if the determination result of the current frame is maintained to be TAB, the state returns to the TAB state. On the other hand, if the determination result of the current frame is changed to 2D and a predetermined period of time elapses, the state is transitioned from the TAB state to the 2D state. In addition, if the determination result of the current frame is changed to SBS and a predetermined period of time elapses, the state is transitioned from the TAB state to the SBS state.

Figure 11:
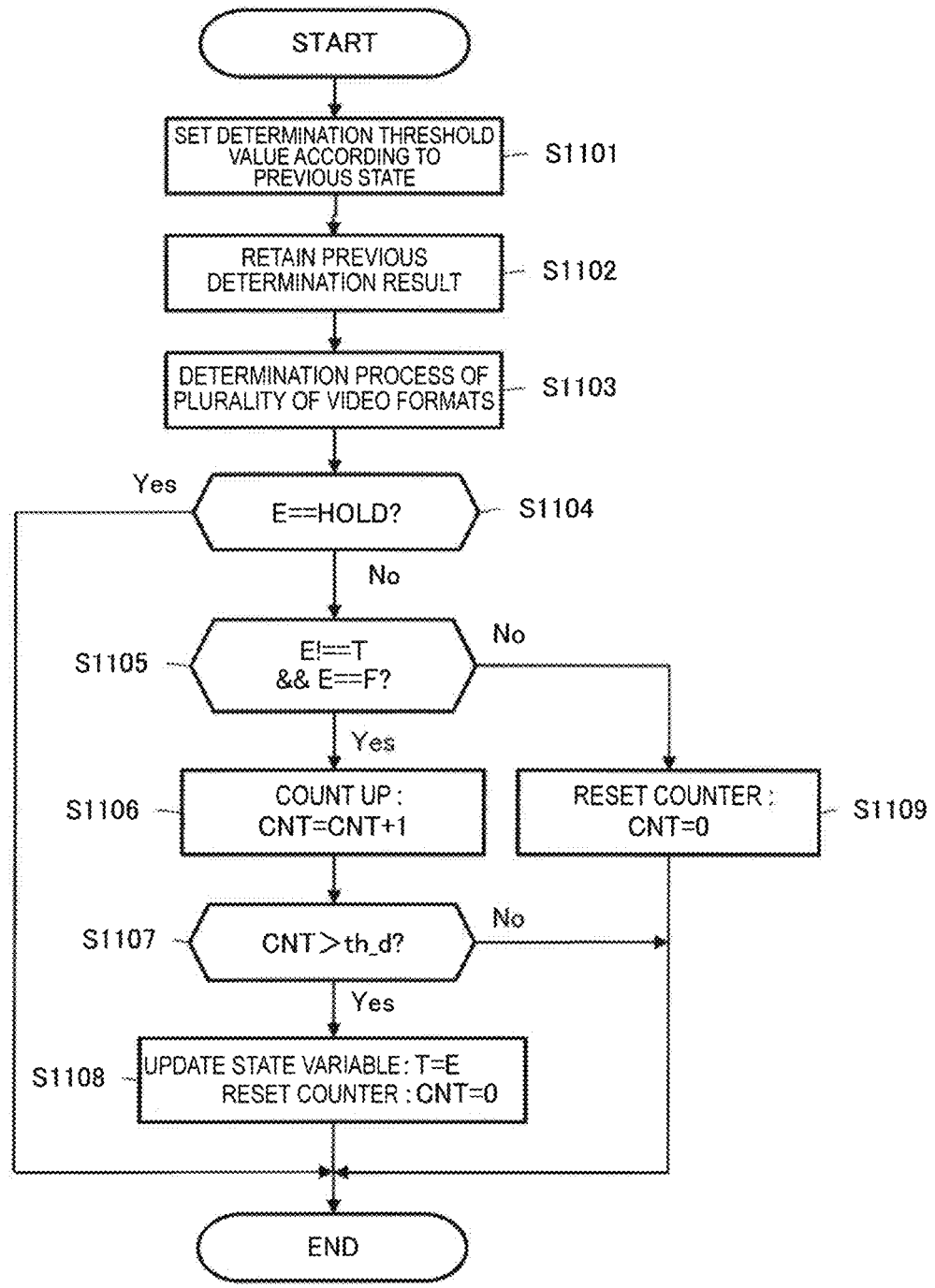
FIG. 11 is a flowchart showing a process for determining whether or not transition should be performed between states in the state transition diagram shown in FIG. 10.

FIG. 11 shows a process of the determination unit 180 to determine whether or not transition should be performed between states in the state transition diagram shown in FIG. 10 in the form of a flowchart.

First, the determination unit 180 sets different determination threshold values in each state according to a state T in a previous frame (Step S1101).

In the 2D state, for example, determination threshold values that facilitate detection of two-dimensional video such as th_a=0.15 and th_b=0.3 are set so that transition from detection of the two-dimensional video does not frequently occur. In addition, in the case of a three-dimensional video state such as the SBS state or the TAB state, determination threshold values that facilitate detection of three-dimensional video such as th_a=0.25 and th_b=0.45 are set so that transition from detection of the three-dimensional video does not frequently occur.

When a determination result is ambiguous, the determination unit 180 is made to respond only when video in a clearly different format is input without allowing the determination state T to be transitioned, by suppressing the frequency of transition from each state by the determination unit 180 in this manner, and accordingly, the intervals of determination results can be stabilized.

Herein the determination unit 180 retains E for a variable F as the previous determination result (previous frame) before performing determination of a plurality of video formats (Step S1102). Note that, at this moment, when E means HOLD (determination deferred), the value of the variable F is not updated. With this operation, E is not substituted for a previous determination result F. The initial value of E is set to be the same value as T.

Then, the determination unit 180 executes a determination process for the plurality of video formats according to the process shown in FIG. 9, and then obtains the determination result E for the current frame (Step S1103).

Next, the determination unit 180 checks whether or not the determination result E of the current frame is HOLD (determination deferred) (Step S1104).

Herein, when the determination result E of the current frame is HOLD (determination deferred) (Yes in Step S1104), the process routine ends without updating either of the state T and a counter CNT that measures the time elapsed from detection of a change in the state.

On the other hand, when the determination result E of the current frame is not HOLD (determination deferred) (No in Step S1104), it is further checked whether the determination result E of the current frame is different from the current state T and the same as the previous determination result F (Step S1105).

When the determination result E of the current frame is different from the current state T and the same as the previous determination result F (Step S1105), the counter CNT that measures the elapsed time counts up values (Step S1106).

Then, when a value of the counter CNT that measures the elapsed time exceeds a predetermined threshold value (change time) th_d (Yes in Step S1107), the current state T is updated to the determination result E of the current frame, and the counter CNT is reset so as to have the value of 0 (Step S1108), and the process routine ends.

In addition, when the determination result E of the current frame is the same as the current state T, or different from the previous determination result F (No in Step S1105), the changed determination result is not stabilized, and thus the counter CNT that measures the elapsed time is reset so as to have the value of 0 (Step S1109), and then the process routine ends.

With the process shown in FIG. 11, the determination unit 180 obtains a determination result different from a current state, and when the different determination result is continued for a given time or longer, the state is transitioned to a new state as a determination result of a video format, and accordingly, stabilized determination of a video format can be performed. As a result, the display device 2000 can stably display a moving image according to the determination result.

The characteristics of the video format determination device 100 shown in FIG. 1 are summarized as follows.

(1) The region representative value calculation unit 120 converts an input video signal of high resolution into representative values of feature amounts for every small region. Accordingly, format determination that is hardly affected by parallax, bands of video signals, and noise can be performed. In addition, by performing conversion into representative values of feature amounts of every small region, format determination can be performed with a small calculation amount.

(2) The correction value calculation unit 130 computes a correction value based on an average value of feature amounts computed for each region, and the data correction unit 140 corrects the representative values of each region using this correction value, and thus, when the correlation between the left- and right-eye video regions is calculated in the latter stage, influence of contrast, γ, and color can be suppressed.

Figure 28:
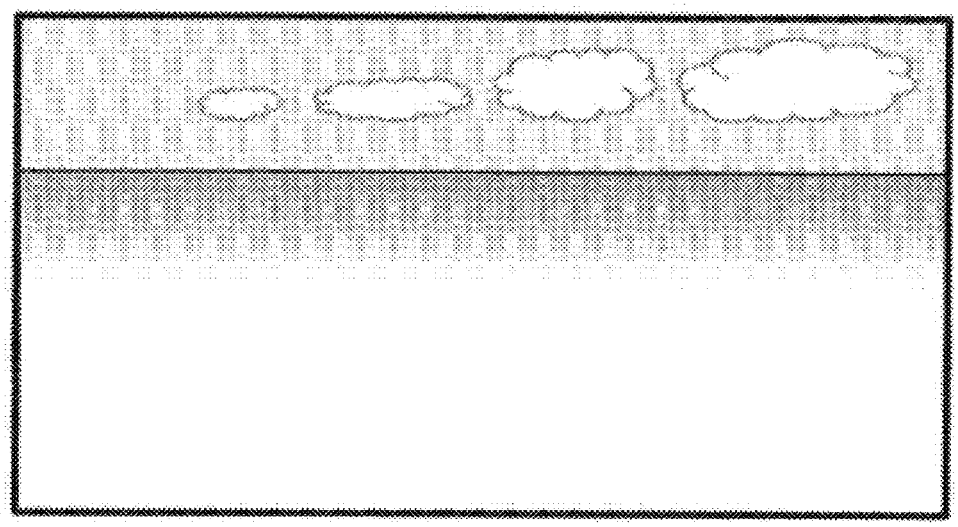
FIG. 28 is a diagram exemplifying a case in which a two-dimensional video having a high correlation between the right and left sides is erroneously determined as a three-dimensional video in the side-by-side format.

(3) Since the intra-region correlation calculation unit 160 calculates intra-region correlation between the left- and right-eye video regions and the evaluation value calculation unit 170 computes a determination value from the ratio of the inter-region correlation value to the intra-region correlation value at the same time as calculation of the correlation between the regions, format determination that is hardly affected by contrast, γ, and color can be performed. In addition, since there is little influence of two-dimensional video (refer to FIG. 28) having a high correlation between the left and right sides, performance of discriminating two-dimensional video from three-dimensional video can be enhanced.

(4) During the calculation of the correlation between the left- and right-eye video regions, the cumulative difference value calculation unit 150 uses a weighting function. Accordingly, by suppressing the influence of parallax, bands of video signals, and noise, determination accuracy of three-dimensional video improves.

(5) The determination unit 180 determines a format of input video using a determination value computed based on an evaluation value of the correlation between the regions, but by providing deferment of determination in determination of a three-dimensional video format and a two-dimensional video format, the risk of erroneous determination can be lowered.

(6) By changing a method of dividing and processing the left- and right-eye video regions, the video format determination device 100 can be applied to determination of a plurality of different three-dimensional video formats, beginning from the side-by-side format and the top-and-bottom format.

(7) In addition, by switching a plurality of determination modes and consecutively executing determination processes, the video format determination device 100 can simultaneously determine a plurality of three-dimensional video formats.

(8) When the video formation of a moving image is determined, the video format determination device 100 sets transition of determination results not to frequently occur, or easily determines a desired video format by setting determination threshold values according to a previous determination value.

(9) When the video formation of a moving image is determined, the video format determination device 100 can stabilize the intervals of determination results with reference to the history of the determination results.

Figure 12:
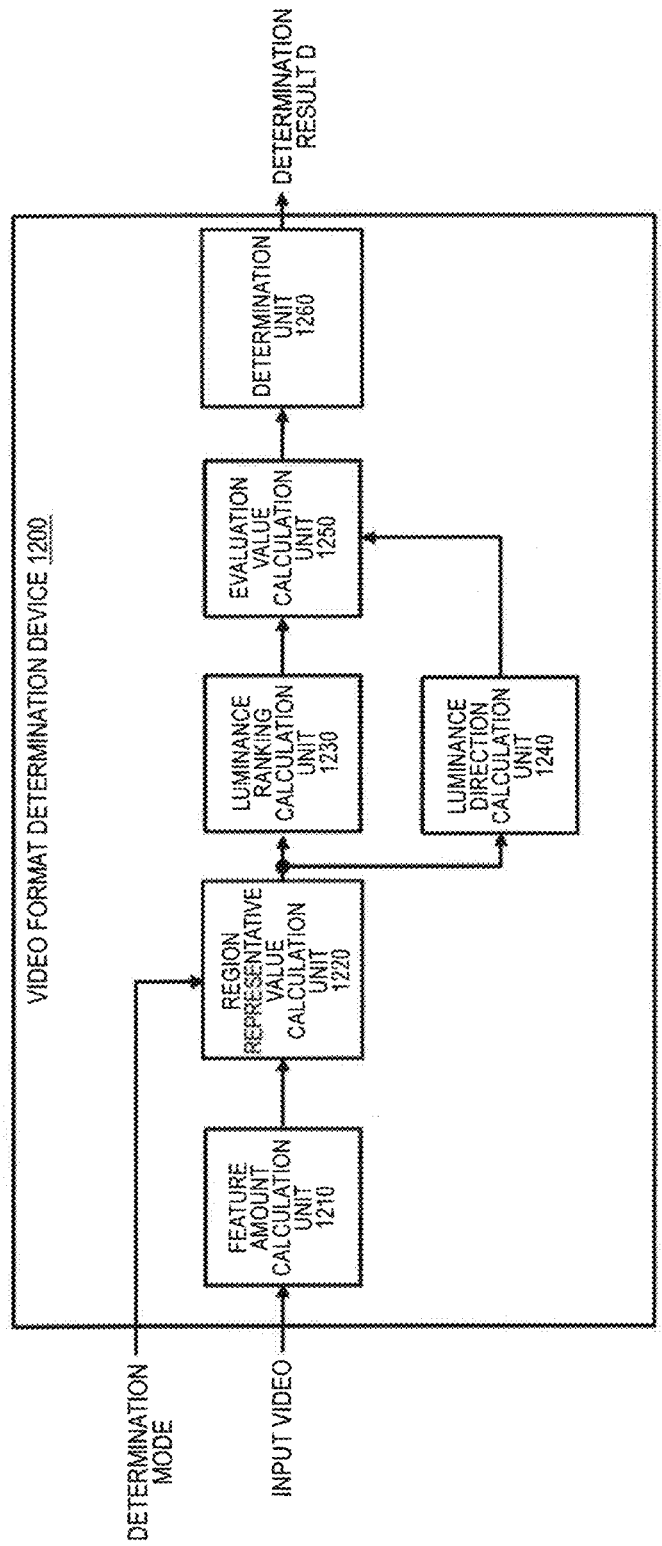
FIG. 12 is a diagram showing another configuration example of a video format determination device 1200.

FIG. 12 shows another configuration example of a video format determination device 1200 which can be applied to determination of an input video format in the video signal processing unit 2001.

The video format determination device 1200 includes a feature amount calculation unit 1210, a region representative value calculation unit 1220, a luminance ranking calculation unit 1230, a luminance direction calculation unit 1240, an evaluation value calculation unit 1250, and a determination unit 1260. A video signal input to the video format determination device 1200 is, for example, an HD signal of 60 Hz having a pixel size of 1920×1080, a video signal having resolution of an SD signal having a pixel size of 720×480, or a still image signal recorded by a digital camera. In the case of a video signal, a video format thereof can be determined by processing one frame out of a moving image of which frames are consecutively input.

The feature amount calculation unit 1210 calculates feature amounts when the video format of input video is determined. Hereinafter, luminance values of input video are set to be used as feature amounts.

The region representative value calculation unit 1220 divides a left-eye video region and a right-eye video region in a video frame respectively into a plurality of small regions according to a determination mode instructed from outside of the video format determination device 1200 automatically or manually by a user, and computes a representative value of feature amounts calculated by the feature amount calculation unit 1210 for each small region. Herein, an average value of the feature amounts (luminance values) of each region is calculated as a representative value.

When, for example, a determination mode in which three-dimensional video in the side-by-side format is determined is set, the region representative value calculation unit 1220 divides input video into two halves on the left and right sides, further divides the respective left and right regions into M×N small regions (refer to FIG. 2), and then computes the average value of the small regions according to the above formulas (1) and (2). In addition, when a determination mode in which three-dimensional video in the top-and-bottom format is determined is set, the region representative value calculation unit 1220 divides input video into two halves on the upper and lower sides, further divides the respective upper and lower regions into M×N small regions (refer to FIG. 3), and then computes the average value of the small regions.

Note that, as methods for dividing input video, a method in which contracted regions of blocks obtained by dividing a left-eye video region and a right-eye video region so as to respectively have M rows and N columns are used (refer to FIG. 4), and a method in which an overlapping region with adjacent blocks is used (refer to FIG. 5) are exemplified, in addition to the method in which the regions are clearly divided into blocks as shown in FIGS. 2 and 3.

In addition, the number of divisions within the range not affected by parallax is also a characteristic of the technology disclosed in the present specification. In other words, in the examples shown in FIGS. 2 and 3, the number of M×N divisions is set to 4×4 divisions respectively for the left-eye video region and the right-eye video region, but a sufficiently rough number such as 16×16 divisions, 12×12 divisions, or 8×8 divisions is another characteristic thereof. The number of divisions that is asymmetric in the horizontal direction and the vertical direction such as 16×8 divisions may be used. In this manner, by using a sufficiently rough number of divisions for input video, the influence of noise or bands of video signals as well as the influence of parallax can be eliminated, and at the same time, a calculation amount can be reduced.

The luminance ranking calculation unit 1230 ranks the small regions in each row respectively for the left-eye display region on the left half of a video frame and the right-eye display region on the right half thereof based on the representative value of each small region, that is average luminance computed by the region representative value calculation unit 1220. For example, it is assumed that input video is three-dimensional video in the side-by-side format shown in FIG. 13 and results obtained by computing representative values for each small region of the video using the region representative value calculation unit 1220 are as shown in FIG. 14. In this case, if ranking of small regions for each row in each of the left-eye display region and the right-eye display region is performed by the luminance ranking calculation unit 1230, the results shown in FIG. 15 are obtained. In addition, when the input video is in the top-and-bottom format, the luminance ranking calculation unit 1230 ranks the small regions in each column in each of the left-eye display region on the upper half and the right-eye display region on the lower half of a video frame.

The luminance direction calculation unit 1240 calculates directions in which luminance changes in the small regions in each of the left-eye display region and the right-eye display region in a video frame based on the representative values of each small region, that is, the average luminance computed in the region representative value calculation unit 1220.

Figure 13:
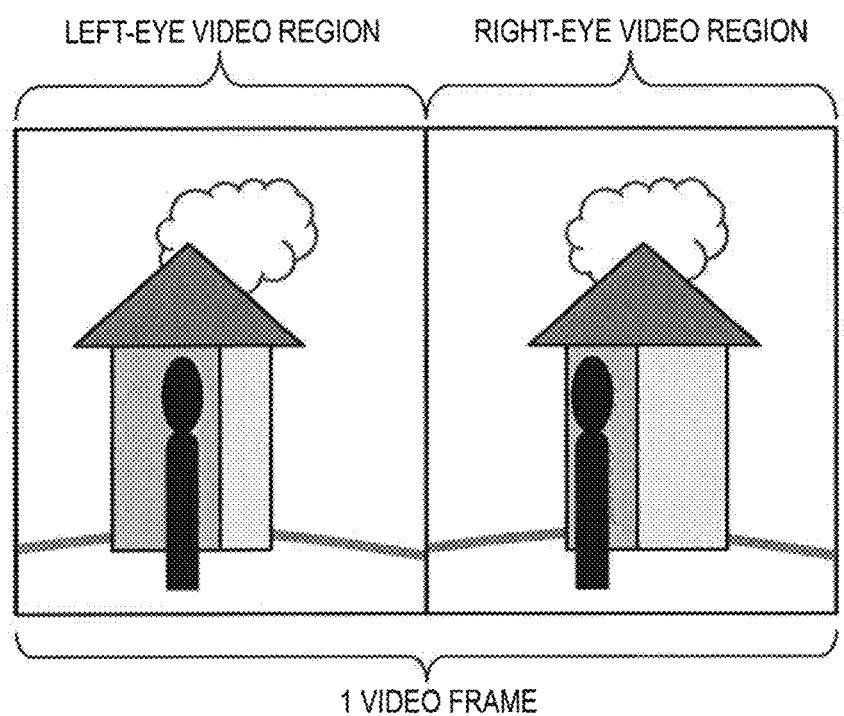
FIG. 13 is a diagram exemplifying a three-dimensional video in the side-by-side format.
Figure 17:
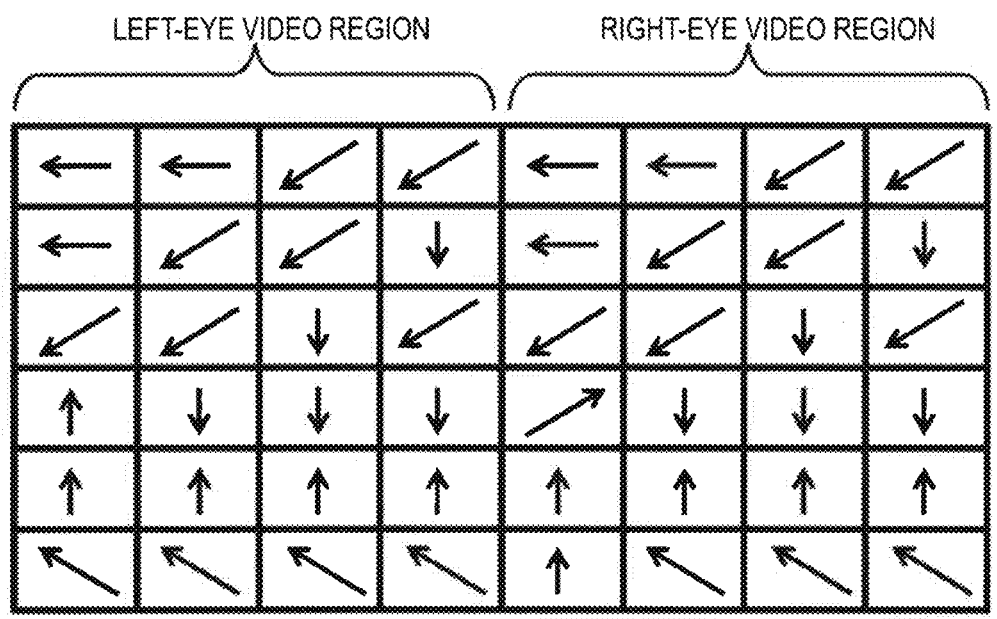
FIG. 17 is a diagram showing results of directions of luminance changes in each small region obtained by applying the template matching of Prewitt to the calculation result of the representative values of the small regions shown in FIG. 14.

For example, the direction of luminance changes can be obtained for small regions at the center of 3×3 by multiplying a 3×3 weighting filter coefficient for each small 3×3 region. As a weighting filter of this kind, template matching of Prewitt (for example, refer to Japanese Unexamined Patent Application Publication No. 2009-217606) is known. In this matching method, 8 kinds of masks respectively having values and directions of masks as shown in FIG. 16 are used. Then, a product-sum operation of each average luminance of a focused small area and 8 peripheral small regions and the values of the masks is performed, and a direction indicated by a mask having a maximum value is set to serve as the direction of a luminance change of the focused small region. If the 8 masks shown in FIG. 16 are used, 8 directions of the luminance changes are obtained at every 45 degrees. If the template matching of Prewitt is applied to three-dimensional video in the side-by-side format as shown in FIG. 13, the changes of luminance direction as shown in FIG. 17 can be obtained.

Figure 18:
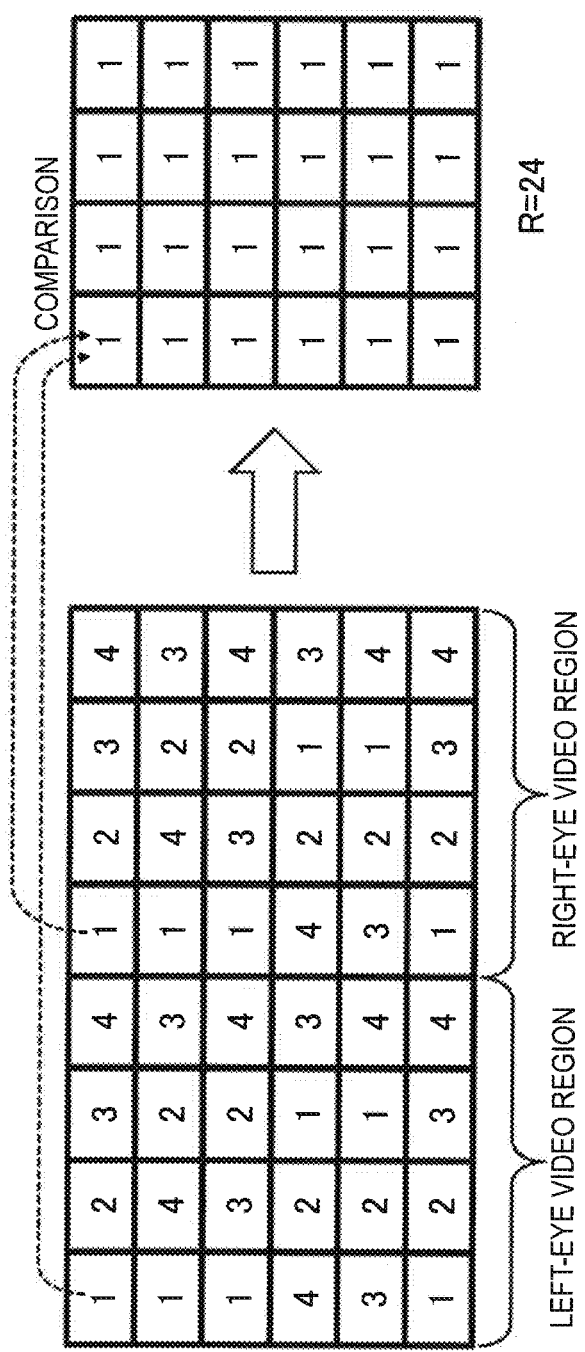
FIG. 18 is a diagram showing evaluation results for the results of ranking of luminance shown in FIG. 15.

The evaluation value calculation unit 1250 compares the results obtained from ranking by the luminance ranking calculation unit 1230 for corresponding small regions of the left-eye video region and the right-eye video region. Then, small regions of which the rankings coincide on the left and right sides are set to have 1, those that do not coincide are set to have 0, and the number of regions R of which the rankings coincide on the left and right sides is computed as an evaluation value for ranking. As the number of small regions of which the rankings coincide increases, in other words, as the value of R becomes large, input video can be determined to be three-dimensional video. FIG. 18 shows evaluation results for the results of ranking of luminance shown in FIG. 15. In the example of the drawing, since the rankings of all 24 small regions coincide, the evaluation value R is 24.

Figure 19:
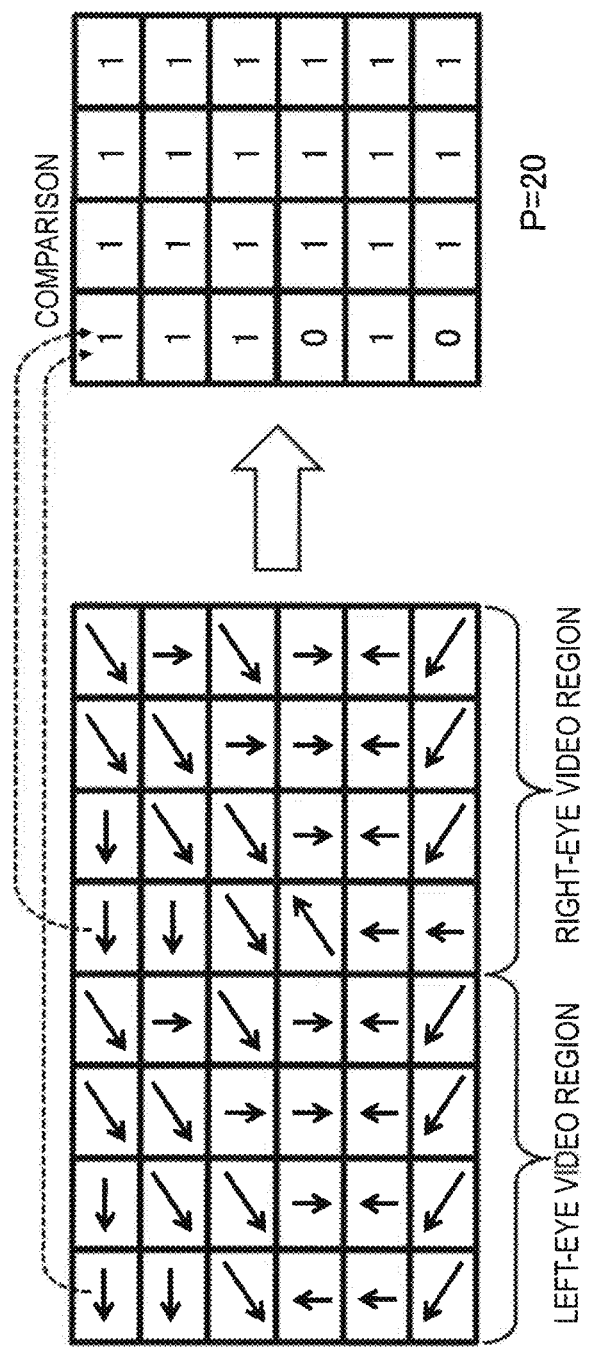
FIG. 19 is a diagram showing evaluation results for the calculation results of the directions of luminance changes shown in FIG. 17.

In addition, the evaluation value calculation unit 1250 compares the results obtained by calculating the directions of luminance changes using the luminance direction calculation unit 1240 for corresponding small regions of the left-eye video region and the right-eye video region. Then, small regions of which the directions of the luminance changes coincide on the left and right sides are set to have 1, those that do not coincide are set to have 0, and the number of regions P of which the directions of the luminance changes coincide on the left and right sides is computed as an evaluation value for a direction of a luminance change. If the 8 masks shown in FIG. 16 are used, 8 directions of the luminance changes are obtained at every 45 degrees. When the determination criterion is alleviated, an allowable range of a direction of a luminance change on the left and right sides (for example, −45 degrees, 0 degrees, and 45 degrees are assumed to coincide with each other), and a region that belongs to the range is obtained. As the number of small regions in which the directions of luminance changes coincide increases, in other words, as the value of P becomes large, input video can be determined to be three-dimensional video. FIG. 19 shows evaluation results for the calculation results of the directions of the luminance changes shown in FIG. 17. In the example of the drawing, since the rankings of 22 out of 24 small regions coincide, the evaluation value P is 22.

For example, the determination unit 1260 provides three-dimensional video determination threshold values th_R_3D and th_P_3D, and two-dimensional video determination threshold values th_R_2D and th_P_2D for each of the evaluation values R and P. Then, since the degree of similarity of the left- and right-eye video regions increases as the evaluation values become higher, there is a possibility of three-dimensional video. Conversely, since the degree of similarity of the left- and right-eye video regions decreases as the evaluation values become lower, there is a possibility of two-dimensional video. In addition, when a video is not determined to be three-dimensional video or two-dimensional video due to an intermediate degree of similarity, the determination unit 1260 defers determination. Specifically, based on the rankings of luminance and directions of luminance changes, determination can be made using the following respective formulas (12) and (13).

$$\text{Determination based on rankings of luminance} \quad (13)$$
$$R \geq TH\_R\_3D \Rightarrow \text{Determined to be three-dimensional video}$$
$$TH\_R\_3D > R > TH\_R\_2D \Rightarrow \text{Determination deferred}$$
$$TH\_R\_2D \geq R \Rightarrow \text{Determined to be two-dimensional video}$$

$$\text{Determination based on directions of luminance changes} \quad (14)$$
$$P \geq TH\_P\_3D \Rightarrow \text{Determined to be three-dimensional video}$$
$$TH\_P\_3D > P > TH\_P\_2D \Rightarrow \text{Determination deferred}$$
$$TH\_P\_2D \geq P \Rightarrow \text{Determined to be two-dimensional video}$$

The determination unit 1260 can determine the format of input video with reference to either or both of the evaluation values R and P calculated by the evaluation value calculation unit based on calculation results by the luminance ranking calculation unit 1230 and the luminance direction calculation unit 1240.

In addition, since the above determination is executed in units of one input frame, there is a possibility of the determination result changing in units of one frame due to changes and noise of an image in the case of a moving image. If the determination result changes in a short period of time, display formats output by the display device 2000 on the screen thereof change too often, and thus there is concern of such changes causing viewers displeasure. Thus, it is necessary to stabilize the intervals of the determination results output from the video format determination device 1200. Therefore, using the following methods, the determination unit 1260 may suppress determination changes in time directions.

(1) When the same determination result is obtained N consecutive times (for N frames), the determination is confirmed.

(2) M or more determination results out of the N consecutive determinations (for N frames) are adopted.

In addition, when there is no determination result that satisfies the condition (1) or (2), an input video cannot be determined to be three-dimensional video or two-dimensional video, and thus the determination unit 1260 may output a result of "determination deferred".

The characteristics of the video format determination device 100 shown in FIG. 1 are summarized below.

(1) Since determination is made without considering absolute values of luminance in the left- and right-eye video regions, a video format can be accurately determined even for a three-dimensional video image of which luminance significantly deviates in the left- and right-eye video regions.

(2) The left- and right-eye video regions are respectively divided into small regions, and evaluation is performed using a representative value of average luminance values, or the like for each region. Accordingly, frame determination is hardly affected by parallax, bands of video signals, and noise.

(3) The left- and right-eye video regions are respectively divided into small regions, and evaluation is performed using a representative value of average luminance values, or the like for each region. Thus, a calculation amount may be small in comparison to a method in which evaluation is performed in a unit of pixels.

(4) The video format determination device 1200 can be applied to determination of a plurality of different three-dimensional video formats beginning from the side-by-side format and the top-and-bottom format by changing a method of dividing and processing left- and right-eye video regions.

Additionally, the present technology may also be configured as below.

(1) A video format determination device including:

a video input unit that receives video having a feature amount for each pixel;

a region representative value calculation unit that divides a left-eye video region and a right-eye video region in a three-dimensional video format to be determined in input video into small regions having M rows and N columns, respectively, and then computes representative values of feature amounts of the respective small regions for each of the left-eye video region and the right-eye video region;

a correction value calculation unit that calculates a correction value to correct the representative values based on an average value of feature amounts of the left-eye video region and an average value of feature amounts of the right-eye video region;

a data correction unit that corrects the representative values of the respective small regions computed for one of the left-eye video region and the right-eye video regions using the correction value;

an inter-region correlation calculation unit that calculates the correlation between the left- and right-eye video regions by cumulatively adding differences of the representative values of corresponding small regions in the left-eye video region and the right-eye video region; and an evaluation determination unit that evaluates the correlation between the left- and right-eye video regions to determine whether input video is in the three-dimensional video format.

(2) A video format determination device including:

a video input unit that receives video having a feature amount for each pixel;

a region representative value calculation unit that divides a left-eye video region and a right-eye video region in a three-dimensional video format to be determined in input video into small regions having M rows and N columns, respectively, and then computes representative values of feature amounts of the respective small regions for each of the left-eye video region and the right-eye video region;

an inter-region correlation calculation unit that calculates the correlation between the left- and right-eye video regions by cumulatively adding differences of the representative values of corresponding small regions in the left-eye video region and the right-eye video region;

an intra-region correlation calculation unit that calculates the correlation within at least one region of the left-eye video region and the right-eye video region; and an evaluation determination unit that calculates an evaluation value based on a ratio of the correlation between the left- and right-eye video regions to the correlation within the region to determine whether input video is in the three-dimensional video format based on the evaluation value.

(3) The video format determination device according to (1), wherein the region representative value calculation unit uses a luminance signal of each pixel as a feature amount.

(4) The video format determination device according to (1) or (2), wherein the inter-region correlation calculation unit calculates the correlation between the left- and right-eye video regions based on the differences of the representative values of corresponding small regions in the left-eye video region and the right-eye video region.

(5) The video format determination device according to (1) or (2), wherein the inter-region correlation calculation unit calculates the correlation between the left- and right-eye video regions by performing cumulative weighted addition of the differences of the representative values of corresponding small regions between the left-eye video region and the right-eye video region.

(6) The video format determination device according to (5), wherein the inter-region correlation calculation unit performs the cumulative weighted addition using a weighting function that suppresses addition of a difference whose value is equal to or lower than a predetermined value.

(7) The video format determination device according to (1), further including:

an intra-region correlation calculation unit that calculates the correlation within at least one region of the left-eye video region and the right-eye video region, wherein the evaluation determination unit calculates an evaluation value based on a ratio of the correlation between the left- and right-eye video regions to the correlation within the region to determine whether input video is in the three-dimensional video format based on the evaluation value.

(8) The video format determination device according to (2) or (7), wherein the evaluation determination unit defers determination of a video format of input video when the correlation within the region has a value equal to or lower than a predetermined threshold value.

(9) The video format determination device according to (1) or (2), wherein the region representative value calculation unit disposes the left-eye video region and the right-eye video region on left and right of the input video, respectively, and computes representative values of the respective small regions in a determination mode to determine whether or not the input video is three-dimensional video in a side-by-side format.

(10) The video format determination device according to (1) or (2), wherein the region representative value calculation unit disposes the left-eye video region and the right-eye video region on top and bottom of the input video, respectively, and computes representative values of the respective small regions in a determination mode to determine whether or not the input video is three-dimensional video in a top-and-bottom format.

(11) The video format determination device according to (1) or (2), wherein a plurality of determination modes in which a video format is determined with regard to each of a plurality of three-dimensional video formats is provided, and wherein, when input video is determined not to be three-dimensional video in a certain determination mode, the evaluation determination unit determines whether or not the input video is three-dimensional video by switching to another determination mode.

(12) The video format determination device according to (1) or (2), wherein, during determination of a video format of a moving image, the evaluation determination unit decides whether or not a determination state of a video format should be transitioned based on a determination result of a video format for a current frame, a determination state of a video format for the previous frame, and a time elapsed from a change in the determination result.

(13) The video format determination device according to (12), wherein the evaluation determination unit sets a threshold value to be used in determining an evaluation value according to a determination state of a video format.

(14) A video format determination device including:

a video input unit that receives video having a feature amount for each pixel;

a region representative value calculation unit that divides a left-eye video region and a right-eye video region in a three-dimensional video format to be determined in input video into small regions having M rows and N columns, respectively, and then computes representative values of feature amounts of the respective small regions for each of the left-eye video region and the right-eye video region;

a representative value ranking calculation unit that calculates rankings of the small regions for each row and each column based on the computed representative values in each of the left-eye video region and the right-eye video region; and an evaluation determination unit that evaluates a degree of similarity of rankings of corresponding small regions between the left-eye video region and the right-eye video region to determine whether or not the input video is in the three-dimensional video format.

(15) A video format determination device including:

a video input unit that receives video having a feature amount for each pixel;

a region representative value calculation unit that divides a left-eye video region and a right-eye video region in a three-dimensional video format to be determined in input video into small regions having M rows and N columns, respectively, and then computes representative values of feature amounts of the respective small regions for each of the left-eye video region and the right-eye video region;

a representative value direction calculation unit that calculates directions in which the representative values change in each of the small regions in each of the left-eye video region and the right-eye video region; and an evaluation determination unit that further evaluates a degree of similarity of directions in which the representative values change in corresponding small regions in the left-eye video region and the right-eye video region to determine whether or not the input video is in the three-dimensional video format.

(16) The video format determination device according to (15), wherein, by multiplying a weighting filter coefficient of n m by each of n m small regions in each of the left-eye video region and the right-eye video region, the representative value direction calculation unit calculates the directions in which the representative values change in each of the small regions.

(17) A video format determination method including:

receiving video having a feature amount for each pixel;

dividing a left-eye video region and a right-eye video region in a three-dimensional video format to be determined in input video into small regions having M rows and N columns, respectively, and then computing representative values of feature amounts of the respective small regions for each of the left-eye video region and the right-eye video region;

calculating a correction value to correct the representative values based on an average value of feature amounts of the left-eye video region and an average value of feature amounts of the right-eye video region;

correcting the representative values of the respective small regions computed for one of the left-eye video region and the right-eye video regions using the correction value;

calculating the correlation between the left- and right-eye video regions by cumulatively adding differences of the representative values of corresponding small regions in the left-eye video region and the right-eye video region; and evaluating the correlation between the left- and right-eye video regions to determine whether input video is in the three-dimensional video format.

(18) A video format determination method including:

receiving video having a feature amount for each pixel;

dividing a left-eye video region and a right-eye video region in a three-dimensional video format to be determined in input video into small regions having M rows and N columns, respectively, and then computing representative values of feature amounts of the respective small regions for each of the left-eye video region and the right-eye video region;

calculating the correlation between the left- and right-eye video regions by cumulatively adding differences of the representative values of corresponding small regions in the left-eye video region and the right-eye video region;

a. calculating the correlation within at least one region of the left-eye video region and the right-eye video region; and calculating an evaluation value based on a ratio of the correlation between the left- and right-eye video regions to the correlation within the region to determine whether input video is in the three-dimensional video format based on the evaluation value.

(19) A video format determination method including:

receiving video having a feature amount for each pixel;

dividing a left-eye video region and a right-eye video region in a three-dimensional video format to be determined in input video into small regions having M rows and N columns, respectively, and then computing representative values of feature amounts of the respective small regions for each of the left-eye video region and the right-eye video region;

calculating rankings of the small regions for each row and each column based on the computed representative values in each of the left-eye video region and the right-eye video region; and evaluating a degree of similarity of rankings of corresponding small regions between the left-eye video region and the right-eye video region to determine whether or not the input video is in the three-dimensional video format.

(20) A video format determination method including:
receiving video having a feature amount for each pixel;
dividing a left-eye video region and a right-eye video region in a three-dimensional video format to be determined in input video into small regions having M rows and N columns, respectively, and then computing representative values of feature amounts of the respective small regions for each of the left-eye video region and the right-eye video region;

calculating directions in which the representative values change in each of the small regions in each of the left-eye video region and the right-eye video region; and evaluating a degree of similarity of directions in which the representative values change in corresponding small regions in the left-eye video region and the right-eye video region to determine whether or not the input video is in the three-dimensional video format.

(21) A display device including:
an input unit that receives video signals;
a video signal processing unit that determines the format of input video signals, and performs processing of a three-dimensional video signal or a two-dimensional video signal by switching display formats according to the determination result; and a display unit that displays video signals that have been processed in the video signal processing unit on a screen, wherein the video signal processing unit divides a left-eye video region and a right-eye video region in a three-dimensional video format to be determined in input video into small regions having M rows and N columns, respectively, and then computes representative values of feature amounts of the respective small regions for each of the left-eye video region and the right-eye video region, calculates a correction value to correct the representative values based on an average value of feature amounts of the left-eye video region and an average value of feature amounts of the right-eye video region, calculates a correction value to correct the representative values based on an average value of feature amounts of the left-eye video region and an average value of feature amounts of the right-eye video region using the correction value, calculates the correlation between the left- and right-eye video regions by cumulatively adding differences of the representative values of corresponding small regions in the left-eye video region and the right-eye video region, and evaluates the correlation between the left- and right-eye video regions to determine whether input video is in the three-dimensional video format.

Hereinabove, the technology disclosed in the present specification has been described in detail with reference to a specific embodiment. However, it should be understood by those skilled in the art that various modifications, combinations, sub-combinations and alterations may occur depending on design requirements and other factors insofar as they are within the scope of the appended claims or the equivalents thereof In the present specification, description has been provided focusing on an embodiment in which a three-dimensional video format such as the side-by-side format and the top-and-bottom format in which left and right videos are transmitted as one frame is determined, but the application range of the technology disclosed in the present specification is not limited to any specific three-dimensional video format. For example, in a case of the frame sequential scheme in which left-eye video and right-eye video are alternately transmitted for each frame, the technology disclosed in the present specification can be realized in the same manner by performing calculation of the correlation between regions and calculation of intra-region correlation.

In addition, the technology disclosed in the present specification can be applied not only to a three-dimensional video display format using active glasses such as the shutter glasses as described above but also to a three-dimensional video display format using passive glasses and a three-dimensional video display format for the naked eye.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus included in a display device, the apparatus comprising:
a transmitter that transmits signals to shutter glasses; and
a video format determination device including processing circuitry configured to:
receive at least one video having a feature amount for each pixel;
divide a left-eye video region and a right-eye video region in a three-dimensional video format to be determined in input video into a plurality of blocks having M rows and N columns, respectively, and compute representative values of feature amounts of the respective plurality of blocks for each of the left-eye video region and the right-eye video region, both M and N being 2 or more;
calculate a correction value to correct the representative values based on an average value of the feature amounts of the left-eye video region and an average value of the feature amounts of the right-eye video region;
correct the representative values of the respective plurality of blocks computed for one of the left-eye video region and the right-eye video region using the correction value;
calculate a correlation between the left-eye video region and the right-eye video region by cumulatively adding differences of the representative values of the corresponding plurality of blocks in the left-eye video region and the right-eye video region;
calculate an intra-region correlation that is a correlation value within one of the left-eye video region and the right-eye video region or is an average of the correlation value in the left-eye video region and the correlation value in the right-eye video region; and
determine whether the input video is in the three-dimensional video format or in a two-dimensional video format based on a ratio between the correlation and the intra-region correlation.

2. The apparatus according to claim 1, wherein the processing circuitry is configured to use, for each respective pixel, a luminance value of the pixel as the feature amount for the pixel.

3. The apparatus according to claim 1, wherein the processing circuitry is configured to calculate the correlation between the left-eye video region and the right-eye video region based on the differences of the representative values of the corresponding plurality of blocks in the left-eye video region and the right-eye video region.

4. The apparatus according to claim 1, wherein the processing circuitry is configured to calculate the correlation between the left-eye video region and the right-eye video region by performing cumulative weighted addition of the differences of the representative values of the corresponding plurality of blocks between the left-eye video region and the right-eye video region.

5. The apparatus according to claim 4, wherein the processing circuitry is configured to perform the cumulative weighted addition using a weighting function that suppresses addition of a difference whose value is equal to or lower than a predetermined value.

6. The apparatus according to claim 1, wherein the processing circuitry is further configured to
calculate an evaluation value based on the ratio between the correlation and the intra-region correlation, and
determine whether the input video is in the three-dimensional video format or in the two-dimensional video format based on the evaluation value.

7. The apparatus according to claim 6, wherein the processing circuitry is configured to defer determination of a video format of the input video when the correlation within at least one region of the left-eye video region and the right-eye video region has a value equal to or lower than a predetermined threshold value.

8. The apparatus according to claim 1, wherein the processing circuitry is further configured to
dispose the left-eye video region and the right-eye video region on the left and right of the input video, respectively, and
compute the representative values of the respective plurality of blocks in a determination mode to determine whether the input video is the three-dimensional video in a side-by-side format.

9. The apparatus according to claim 1, wherein the processing circuitry is further configured to
dispose the left-eye video region and the right-eye video region on the top and bottom of the input video, respectively, and
compute the representative values of the respective plurality of blocks in a determination mode to determine whether the input video is the three-dimensional video in a top-and-bottom format.

10. The apparatus according to claim 1, wherein
a plurality of determination modes in which a video format is determined with regard to each of a plurality of three-dimensional video formats is provided, and
the processing circuitry is configured to, when the input video is determined to not be a three-dimensional video in a certain determination mode, determine whether the input video is the three-dimensional video by switching to another determination mode.

11. The apparatus according to claim 1, wherein the processing circuitry is configured to, during determination of a video format of a moving image, decide whether a determination state of the video format should be transitioned based on a determination result of the video format for a current frame, a determination state of the video format for the previous frame, and a time elapsed from a change in the determination result.

12. The apparatus according to claim 1, wherein the processing circuitry is configured to set a threshold value to be used in determining an evaluation value according to a determination state of a video format.

13. A video format determination method, comprising:
receiving video having a feature amount for each pixel;
dividing a left-eye video region and a right-eye video region in a three-dimensional video format to be determined in input video into a plurality of blocks having M rows and N columns, respectively, and computing representative values of feature amounts of the respective plurality of blocks for each of the left-eye video region and the right-eye video region, both M and N being 2 or more;
calculating, by processing circuitry, a correction value to correct the representative values based on an average value of the feature amounts of the left-eye video region and an average value of the feature amounts of the right-eye video region;
correcting, by the processing circuitry, the representative values of the respective plurality of blocks computed for one of the left-eye video region and the right-eye video region using the correction value;
calculating, by the processing circuitry, a correlation between the left-eye video region and the right-eye video region by cumulatively adding differences of the representative values of the corresponding plurality of blocks in the left-eye video region and the right-eye video region;
calculating, by the processing circuitry, an intra-region correlation that is a correlation value within one of the left-eye video region and the right-eye video region or is an average of the correlation value in the left-eye video region and the correlation value in the right-eye video region; and
determining, by the processing circuitry, whether the input video is in the three-dimensional video format or in a two-dimensional video format based on a ratio between the correlation and the intra-region correlation.

14. A display device, comprising:
a display panel; and
video signal processing circuitry configured to:
receive at least one video signal;
divide a left-eye video region and a right-eye video region in a three-dimensional video format to be determined in the input video signal into plurality of blocks having M rows and N columns, respectively, and compute representative values of feature amounts of the respective plurality of blocks for each of the left-eye video region and the right-eye video region, both M and N being 2 or more;
calculate a correction value to correct the representative values based on an average value of the feature amounts of the left-eye video region and an average value of the feature amounts of the right-eye video region;
correct the representative values of the respective plurality of blocks computed for one of the left-eye video region and the right-eye video region using the correction value;
calculate a correlation between the left-eye video region and the right-eye video region by cumulatively adding differences of the representative values of the corresponding plurality of blocks in the left-eye video region and the right-eye video region;
calculate an intra-region correlation that is a correlation value within one of the left-eye video region and the right-eye video region or is an average of the correlation value in the left-eye video region and the correlation value in the right-eye video region;

generate an evaluation result, based on a ratio between the correlation and the intra-region correlation, that indicates whether the input video signal is in the three-dimensional video format or in a two-dimensional video format; and process the input signal by switching display formats according to a format indicated in the evaluation result.

* * * * *